United States Patent
Beggs et al.

(10) Patent No.: US 9,542,824 B2
(45) Date of Patent: Jan. 10, 2017

(54) METHODS AND APPARATUS TO DETECT AND WARN PROXIMATE ENTITIES OF INTEREST

(71) Applicants: Ryan P Beggs, Dubuque, IA (US); James C. Boerger, Franksville, WI (US); David J. Hoffmann, Peosta, IA (US); Ken Markham, Lee's Summit, MO (US); Matthew McNeill, Whitefish Bay, WI (US); Timothy Muhl, Slinger, WI (US); Kyle Nelson, Cedarburg, WI (US); James Oates, Mequon, WI (US); Jason Senfleben, Milwaukee, WI (US)

(72) Inventors: Ryan P Beggs, Dubuque, IA (US); James C. Boerger, Franksville, WI (US); David J. Hoffmann, Peosta, IA (US); Ken Markham, Lee's Summit, MO (US); Matthew McNeill, Whitefish Bay, WI (US); Timothy Muhl, Slinger, WI (US); Kyle Nelson, Cedarburg, WI (US); James Oates, Mequon, WI (US); Jason Senfleben, Milwaukee, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 14/610,842

(22) Filed: Jan. 30, 2015

(65) Prior Publication Data
US 2015/0145701 A1   May 28, 2015

Related U.S. Application Data

(63) Continuation of application No. 12/844,295, filed on Jul. 27, 2010, now Pat. No. 9,230,419.

(51) Int. Cl.
*B60Q 1/00* (2006.01)
*G08B 21/02* (2006.01)
(Continued)

(52) U.S. Cl.
CPC .............. *G08B 21/02* (2013.01); *B60Q 1/26* (2013.01); *B60Q 1/2673* (2013.01); *B60Q 1/50* (2013.01);
(Continued)

(58) Field of Classification Search
CPC .............. B60R 1/00; B60Q 1/16; B60Q 1/48; B60Q 1/442; B60Q 1/38; B60Q 1/24; B60Q 1/2665; G01S 7/4802; A61G 3/061
(Continued)

(56) References Cited

U.S. PATENT DOCUMENTS

| 3,380,022 A | 4/1968 | Raschke |
| 4,937,795 A | 6/1990 | Motegi et al. |

(Continued)

FOREIGN PATENT DOCUMENTS

| DE | 202006019689 | 3/2007 |
| EP | 0034562 | 8/1981 |

(Continued)

OTHER PUBLICATIONS

United States Patent and Trademark Office, "Requirement for Restriction/Election," issued in connection with U.S. Appl. No. 12/844,295, Feb. 8, 2013, 7 pages.

(Continued)

*Primary Examiner* — Hoi Lau
(74) *Attorney, Agent, or Firm* — Hanley, Flight & Zimmerman, LLC

(57) ABSTRACT

Systems and methods to detect and warn proximate entities of interest are described herein. An example detection system includes a light source attachable to a forktruck, where the light source projects an illuminated warning field on a floor on which the forktruck is to traverse. The light source projects the illuminated warning field at a distance from a (Continued)

front end of the forktruck. The light source is separate from a headlight of the forktruck.

18 Claims, 19 Drawing Sheets

(51) Int. Cl.
| | |
|---|---|
| *B60Q 1/26* | (2006.01) |
| *B60Q 1/52* | (2006.01) |
| *B60Q 9/00* | (2006.01) |
| *B66F 17/00* | (2006.01) |
| *G08G 1/005* | (2006.01) |
| *G08G 1/16* | (2006.01) |
| *B60Q 1/50* | (2006.01) |
| *G08B 5/36* | (2006.01) |
| *G08B 6/00* | (2006.01) |
| *G08B 21/18* | (2006.01) |

(52) U.S. Cl.
CPC .............. *B60Q 1/525* (2013.01); *B60Q 9/008* (2013.01); *B66F 17/003* (2013.01); *G08B 5/36* (2013.01); *G08B 6/00* (2013.01); *G08B 21/18* (2013.01); *G08G 1/005* (2013.01); *G08G 1/166* (2013.01); *B60Q 2400/50* (2013.01)

(58) Field of Classification Search
USPC ....... 340/475, 435, 467, 944, 439, 476, 432; 116/28 R
See application file for complete search history.

(56) References Cited

U.S. PATENT DOCUMENTS

| | | | |
|---|---|---|---|
| 5,045,700 A | 9/1991 | Crowson et al. | |
| 5,218,344 A | 6/1993 | Ricketts | |
| 5,499,597 A | 3/1996 | Kronberg | |
| 5,572,202 A | 11/1996 | Regel et al. | |
| 5,635,921 A | 6/1997 | Maxwell et al. | |
| 5,697,099 A | 12/1997 | Siska et al. | |
| 5,808,728 A | 9/1998 | Uehara | |
| 5,939,986 A | 8/1999 | Schiffbauer et al. | |
| 6,025,778 A | 2/2000 | Dietz et al. | |
| 6,046,673 A | 4/2000 | Michael et al. | |
| 6,198,386 B1* | 3/2001 | White, II | B60R 1/00 33/264 |
| 6,204,762 B1 | 3/2001 | Dering et al. | |
| 6,208,260 B1 | 3/2001 | West et al. | |
| 6,232,887 B1 | 5/2001 | Carson | |
| 6,268,803 B1 | 7/2001 | Gunderson et al. | |
| 6,307,484 B1 | 10/2001 | Sasaki et al. | |
| 6,393,362 B1 | 5/2002 | Burns | |
| 6,411,054 B1 | 6/2002 | Van Wiemeersch | |
| 6,422,728 B1* | 7/2002 | Riggin | B60Q 1/16 340/475 |
| 6,429,789 B1 | 8/2002 | Kiridena et al. | |
| 6,487,481 B2 | 11/2002 | Tanaka et al. | |
| 6,518,878 B1 | 2/2003 | Skoff | |
| 6,690,291 B1 | 2/2004 | Cardillo et al. | |
| 6,810,330 B2* | 10/2004 | Matsuura | G01S 7/4802 340/435 |
| 6,917,300 B2 | 7/2005 | Allen | |
| 6,958,707 B1 | 10/2005 | Siegel | |
| 6,963,278 B2 | 11/2005 | Frame | |
| 6,975,246 B1 | 12/2005 | Trudeau | |
| 7,047,132 B2 | 5/2006 | Jacobs | |
| 7,136,754 B2 | 11/2006 | Hahn et al. | |
| 7,148,794 B2 | 12/2006 | Stigall | |
| 7,154,379 B2 | 12/2006 | Reed | |
| 7,221,928 B2 | 5/2007 | Laird et al. | |
| 7,233,243 B2 | 6/2007 | Roche et al. | |
| 7,308,118 B1 | 12/2007 | Meadows | |
| 7,339,462 B1 | 3/2008 | Diorio | |
| 7,561,181 B2 | 7/2009 | Schofield et al. | |
| 7,613,560 B2 | 11/2009 | Nishi et al. | |
| 7,797,108 B2 | 9/2010 | Grimm | |
| 7,873,449 B2 | 1/2011 | Bujak et al. | |
| 7,881,868 B2 | 2/2011 | Greene et al. | |
| 8,013,720 B2 | 9/2011 | Oelrich et al. | |
| 8,075,169 B2* | 12/2011 | Englander | B60Q 1/24 362/478 |
| 8,130,120 B2 | 3/2012 | Kawabata et al. | |
| 8,170,787 B2 | 5/2012 | Coats et al. | |
| 8,280,621 B2 | 10/2012 | Edwards et al. | |
| 8,346,468 B2 | 1/2013 | Emanuel et al. | |
| 8,552,847 B1 | 10/2013 | Hill | |
| 8,600,606 B2 | 12/2013 | Nickolaou et al. | |
| 8,618,955 B2 | 12/2013 | Baker | |
| 8,731,815 B2 | 5/2014 | Cummings | |
| 8,779,935 B2 | 7/2014 | Savchenko | |
| 9,202,374 B2 | 12/2015 | Gauger et al. | |
| 9,230,419 B2 | 1/2016 | Beggs et al. | |
| 2001/0035837 A1 | 11/2001 | Fullerton et al. | |
| 2002/0057204 A1 | 5/2002 | Bligh | |
| 2002/0143461 A1 | 10/2002 | Burns et al. | |
| 2002/0175825 A1 | 11/2002 | Clerk et al. | |
| 2002/0190849 A1 | 12/2002 | Orzechowski | |
| 2003/0102974 A1 | 6/2003 | Allen | |
| 2003/0139883 A1 | 7/2003 | Takafuji et al. | |
| 2003/0141965 A1 | 7/2003 | Gunderson et al. | |
| 2003/0146827 A1* | 8/2003 | Koike | B60Q 1/484 340/435 |
| 2003/0197612 A1 | 10/2003 | Tanaka et al. | |
| 2003/0226494 A1 | 12/2003 | Sunaga et al. | |
| 2003/0234725 A1 | 12/2003 | Lemelson et al. | |
| 2004/0004547 A1 | 1/2004 | Appelt et al. | |
| 2004/0019420 A1 | 1/2004 | Rao et al. | |
| 2004/0085218 A1 | 5/2004 | Pecora | |
| 2004/0107031 A1 | 6/2004 | Ichikawa et al. | |
| 2004/0119818 A1 | 6/2004 | Mukaiyama | |
| 2004/0189445 A1 | 9/2004 | Tewell et al. | |
| 2004/0193347 A1 | 9/2004 | Harumoto et al. | |
| 2004/0207519 A1* | 10/2004 | Tracy | A61H 3/061 340/467 |
| 2005/0001728 A1 | 1/2005 | Appelt et al. | |
| 2005/0017862 A1 | 1/2005 | Monck et al. | |
| 2005/0046560 A1 | 3/2005 | Stigall | |
| 2005/0046562 A1 | 3/2005 | Stigall | |
| 2005/0073397 A1* | 4/2005 | Zheng | B60Q 1/48 340/435 |
| 2005/0073437 A1* | 4/2005 | Perri | G08G 1/005 340/944 |
| 2005/0073438 A1 | 4/2005 | Rodgers et al. | |
| 2005/0078003 A1 | 4/2005 | King | |
| 2005/0152142 A1 | 7/2005 | Traynor | |
| 2005/0184864 A1 | 8/2005 | Picard et al. | |
| 2005/0270147 A1* | 12/2005 | Lewis | B66F 17/003 340/439 |
| 2005/0275513 A1 | 12/2005 | Grisham et al. | |
| 2005/0275542 A1 | 12/2005 | Weekes | |
| 2005/0280553 A1 | 12/2005 | DiPiazza | |
| 2006/0031015 A1 | 2/2006 | Paradie | |
| 2006/0091297 A1 | 5/2006 | Anderson et al. | |
| 2006/0097857 A1 | 5/2006 | Osaka et al. | |
| 2006/0103538 A1 | 5/2006 | Daniel | |
| 2006/0103541 A1 | 5/2006 | Esson | |
| 2006/0119473 A1 | 6/2006 | Gunderson et al. | |
| 2006/0125623 A1 | 6/2006 | Appelt et al. | |
| 2006/0132601 A1 | 6/2006 | Kukita et al. | |
| 2006/0146520 A1 | 7/2006 | Vitense et al. | |
| 2006/0187009 A1 | 8/2006 | Kropinski et al. | |
| 2006/0197656 A1 | 9/2006 | Sergio et al. | |
| 2006/0220810 A1 | 10/2006 | Toda et al. | |
| 2007/0008096 A1* | 1/2007 | Tracy | B60Q 1/442 340/476 |
| 2007/0047809 A1 | 3/2007 | Sasaki | |
| 2007/0053195 A1* | 3/2007 | Alberti | B60Q 1/2665 362/494 |
| 2007/0093963 A1 | 4/2007 | Adams | |
| 2007/0096896 A1 | 5/2007 | Zingelewicz et al. | |
| 2007/0109146 A1 | 5/2007 | Tengler et al. | |

(56) References Cited

U.S. PATENT DOCUMENTS

| | | |
|---|---|---|
| 2007/0120672 A1 | 5/2007 | Zuziak et al. |
| 2007/0171046 A1 | 7/2007 | Diem |
| 2007/0210902 A1* | 9/2007 | Stewart ................ B60Q 9/00 340/435 |
| 2007/0222574 A1* | 9/2007 | Courts ................ B60Q 1/24 340/468 |
| 2007/0229238 A1 | 10/2007 | Boyles et al. |
| 2007/0257805 A1 | 11/2007 | Gaglianone |
| 2007/0282530 A1 | 12/2007 | Meister et al. |
| 2008/0018472 A1 | 1/2008 | Dasilva et al. |
| 2008/0021597 A1 | 1/2008 | Merte et al. |
| 2008/0022596 A1 | 1/2008 | Boerger et al. |
| 2008/0089056 A1 | 4/2008 | Grosjean |
| 2008/0097700 A1 | 4/2008 | Grimm |
| 2008/0122598 A1 | 5/2008 | Hamester et al. |
| 2008/0127435 A1 | 6/2008 | Maly et al. |
| 2008/0174415 A1 | 7/2008 | Tanida et al. |
| 2008/0189000 A1 | 8/2008 | Duong |
| 2008/0238636 A1 | 10/2008 | Birging et al. |
| 2008/0266396 A1 | 10/2008 | Stein |
| 2008/0275618 A1 | 11/2008 | Grimm et al. |
| 2008/0303660 A1 | 12/2008 | Lombardi |
| 2008/0309509 A1 | 12/2008 | Ortiz et al. |
| 2009/0013922 A1* | 1/2009 | Lin ................ B60Q 1/38 116/28 R |
| 2009/0043462 A1 | 2/2009 | Stratton et al. |
| 2009/0073679 A1 | 3/2009 | Wainright |
| 2009/0099898 A1 | 4/2009 | Ehrman et al. |
| 2009/0115630 A1 | 5/2009 | Oelrich et al. |
| 2009/0118908 A1 | 5/2009 | Fuller et al. |
| 2009/0174572 A1 | 7/2009 | Smith |
| 2009/0224907 A1 | 9/2009 | Sinha et al. |
| 2009/0237233 A1 | 9/2009 | Smith |
| 2009/0322512 A1 | 12/2009 | Frederick |
| 2009/0322546 A1 | 12/2009 | Kaneblei et al. |
| 2010/0013670 A1 | 1/2010 | Hueppauff et al. |
| 2010/0039247 A1 | 2/2010 | Ziegler et al. |
| 2010/0090856 A1 | 4/2010 | Chen |
| 2010/0114405 A1 | 5/2010 | Elston et al. |
| 2010/0121576 A1 | 5/2010 | Aso et al. |
| 2010/0127841 A1 | 5/2010 | D'Ambrosio et al. |
| 2010/0127846 A1 | 5/2010 | Mahaffy et al. |
| 2010/0182164 A1 | 7/2010 | Diba |
| 2010/0194583 A1 | 8/2010 | Kawabata |
| 2010/0209892 A1 | 8/2010 | Lin et al. |
| 2010/0219946 A1 | 9/2010 | Wang et al. |
| 2010/0219988 A1 | 9/2010 | Griffith |
| 2010/0225481 A1 | 9/2010 | Alberte, Jr. et al. |
| 2010/0228602 A1 | 9/2010 | Gilvar et al. |
| 2010/0283590 A1* | 11/2010 | Tee ................ A42B 3/044 340/432 |
| 2010/0283591 A1 | 11/2010 | Schick |
| 2010/0289662 A1 | 11/2010 | Dasilva et al. |
| 2010/0289663 A1 | 11/2010 | Savchenko |
| 2010/0328443 A1 | 12/2010 | Lynam et al. |
| 2011/0006912 A1 | 1/2011 | Sheardown et al. |
| 2011/0006917 A1 | 1/2011 | Taniguchi et al. |
| 2011/0068910 A1 | 3/2011 | Iwai et al. |
| 2011/0075441 A1 | 3/2011 | Swessel et al. |
| 2011/0106442 A1 | 5/2011 | Desai et al. |
| 2011/0128141 A1* | 6/2011 | Purks ................ B60Q 1/38 340/475 |
| 2011/0128161 A1 | 6/2011 | Bae et al. |
| 2011/0130945 A1 | 6/2011 | Deedy et al. |
| 2011/0157486 A1 | 6/2011 | Murata et al. |
| 2011/0190972 A1 | 8/2011 | Timmons et al. |
| 2011/0196568 A1 | 8/2011 | Nickolaou et al. |
| 2011/0199199 A1 | 8/2011 | Perkins |
| 2011/0205068 A1 | 8/2011 | Huynh et al. |
| 2011/0210872 A1 | 9/2011 | Molander |
| 2011/0246065 A1 | 10/2011 | Spencer, V |
| 2011/0260846 A1 | 10/2011 | Mochizuki et al. |
| 2011/0260856 A1 | 10/2011 | Rossmann et al. |
| 2011/0267179 A1 | 11/2011 | Patterson |
| 2011/0268300 A1 | 11/2011 | Demers et al. |
| 2011/0279261 A1 | 11/2011 | Gauger et al. |
| 2012/0025964 A1* | 2/2012 | Beggs ................ B60Q 1/2673 340/435 |
| 2012/0056734 A1 | 3/2012 | Ikeda et al. |
| 2012/0075110 A1 | 3/2012 | Boughorbel et al. |
| 2012/0098653 A1 | 4/2012 | Slack |
| 2013/0147604 A1 | 6/2013 | Jones, Jr. et al. |
| 2013/0169817 A1 | 7/2013 | Jones et al. |
| 2013/0222573 A1 | 8/2013 | Onuma et al. |
| 2015/0028054 A1 | 1/2015 | Norman |
| 2015/0070178 A1 | 3/2015 | Kline |
| 2015/0116097 A1 | 4/2015 | Cregg et al. |
| 2015/0124087 A1 | 5/2015 | Jones, Jr. et al. |
| 2015/0138002 A1 | 5/2015 | Beggs et al. |
| 2015/0145661 A1 | 5/2015 | Beggs et al. |
| 2015/0145700 A1 | 5/2015 | Beggs et al. |
| 2015/0154863 A1 | 6/2015 | Fossier et al. |
| 2015/0158428 A1 | 6/2015 | Beggs et al. |
| 2015/0170493 A1 | 6/2015 | Beggs et al. |
| 2015/0170498 A1 | 6/2015 | Beggs et al. |
| 2015/0195493 A1 | 7/2015 | Childers |
| 2016/0015329 A1 | 1/2016 | Kohlrausch et al. |
| 2016/0090038 A1 | 3/2016 | Briggs et al. |

FOREIGN PATENT DOCUMENTS

| | | |
|---|---|---|
| EP | 0367034 | 5/1990 |
| EP | 1542194 | 6/2005 |
| EP | 2187370 | 5/2010 |
| WO | 2006085781 | 8/2006 |
| WO | 2009030912 | 3/2009 |
| WO | 2009086636 | 7/2009 |

OTHER PUBLICATIONS

United States Patent and Trademark Office, "Non-Final Office Action," issued in connection with U.S. Appl. No. 12/844,295, Apr. 23, 2015, 34 pages.

United States Patent and Trademark Office, "Notice of Allowance," issued in connection with U.S. Appl. No. 12/844,295, Jul. 30, 2015, 25 pages.

United States Patent and Trademark Office, "Non-Final Office Action," issued in connection with U.S. Appl. No. 14/610,849, Aug. 14, 2015, 33 pages.

European Patent Office, "Communication pursuant to Article 94(3) EPC," issued in connection with European Patent Application No. 11754563.2, dated Nov. 13, 2013, 5 pages.

European Patent Office, "Decision to grant a European patent pursuant to Article 97(1) EPC," issued in connection with European Patent Application No. 11754563.2, dated Sep. 18, 2014, 1 page.

Linde Material Handling, "Safety first—the new Linde BlueSpot family," last retrieved from [http://www.linde-mh.com/en/main_page/products_features_1/linde_bluespot_1/linde_bluespot_1.html] last retrieved on Mar. 2, 2015, Copyright 2015, 3 pages.

Canadian Intellectual Property Office, "Office Action," issued in connection with Canadian Patent Application No. 2,806,320, dated Aug. 14, 2014, 2 pages.

European Patent Office, "Partial European Search Report," issued in connection with European Patent Application No. 14002757.4, dated Oct. 21, 2014, 5 pages.

International Bureau, "International Preliminary Report on Patentability," issued in connection with International Patent Application No. PCT/US2011/045218, mailed Feb. 7, 2013, 12 pages.

International Searching Authority, "International Search Report," issued in connection with International Patent Application No. PCT/US2011/045218, mailed Dec. 28, 2011, 8 pages.

International Searching Authority, "Written Opinion of the International Searching Authority," issued in connection with International Patent Application No. PCT/US2011/045218, mailed Dec. 28, 2011, 11 pages.

International Searching Authority, "Invitation to Pay Additional Fees and Partial Search Report," issued in connection with International Patent Application No. PCT/US2011/045218, mailed Nov. 11, 2011, 7 pages.

(56) References Cited

OTHER PUBLICATIONS

European Patent Office, "European Search Report," issued in connection with European Patent Application No. 14002757.4, dated Feb. 26, 2015, 11 pages.
European Patent Office, "European Search Report," issued in connection with European Patent Application No. 14003506.4, dated Feb. 26, 2015, 8 pages.
European Patent Office, "European Search Report," issued in connection with European Patent Application No. 14003505.6, dated Feb. 26, 2015, 10 pages.
European Patent Office, "European Search Report," issued in connection with European Patent Application No. 14003504.9, dated Feb. 26, 2015, 11 pages.
United States Patent and Trademark Office, "Non-Final Office Action," issued in connection with U.S. Appl. No. 12/844,295, issued on Feb. 4, 2014, 31 pages.
United States Patent and Trademark Office, "Final Office Action," issued in connection with U.S. Appl. No. 12/844,295, issued on Sep. 2, 2014, 26 pages.
United States Patent and Trademark Office, "Notice of Allowance," issued in connection with U.S. Appl. No. 12/844,295, issued on Dec. 5, 2014, 8 pages.
European Patent Office, "Communication pursuant to Article 94(3) EPC," issued in connection with Application No. 14003506.4, Sep. 23, 2015, 5 pages.
European Patent Office, "Communication pursuant to Article 94(3) EPC," issued in connection with Application No. 14003505.6, Sep. 23, 2015, 6 pages.
European Patent Office, "Communication pursuant to Article 94(3) EPC," issued in connection with Application No. 14003504.9, Sep. 23, 2015, 5 pages.
Canadian Intellectual Property Office, "Office Action," issued in connection with Canadian Patent Application No. 2,806,320, Sep. 1, 2015, 4 pages.
United States Patent and Trademark Office, "Notice of Allowance," issued in connection with U.S. Appl. No. 12/844,295, Aug. 28, 2015, 29 pages.
United States Patent and Trademark Office, "Restriction Requirement," issued in connection with U.S. Appl. No. 14/610,854, Jun. 7, 2016, 43 pages.
United States Patent and Trademark Office, "Non-Final Office action," issued in connection with U.S. Appl. No. 14/610,815, Jun. 13, 2016, 62 pages.
United States Patent and Trademark Office, "Restriction," issued in connection with U.S. Appl. No. 14/610,820, Feb. 1, 2016, 35 pages.
United States Patent and Trademark Office, "Restriction," issued in connection with U.S. Appl. No. 14/610,833, Feb. 16, 2016, 35 pages.
United States Patent and Trademark Office, "Restriction," issued in connection with U.S. Appl. No. 14/610,828, Feb. 24, 2016, 36 pages.
United States Patent and Trademark Office, "Non-Final Office Action," issued in connection with U.S. Appl. No. 14/610,828, Apr. 7, 2016, 32 pages.
United States Patent and Trademark Office, "Non-Final Office Action," issued in connection with U.S. Appl. No. 14/610,833, Apr. 8, 2016, 24 pages.
United States Patent and Trademark Office, "Non-Final Office Action," issued in connection with U.S. Appl. No. 14/610,820, Apr. 7, 2016, 33 pages.
European Patent Office, "Intention to Grant," issued in connection with Application No. 14003504.9, Feb. 23, 2016, 7 pages.
European Patent Office, "Intention to Grant," issued in connection with Application No. 14003505.6, Feb. 24, 2016, 7 pages.
United States Patent and Trademark Office, "Final Office Action," issued in connection with U.S. Appl. No. 14/610,849, Mar. 10, 2016, 36 pages.
European Patent Office, "Decision to grant a European patent pursuant to Article 97(1) EPC," issued in connection with European Patent Application No. 14003506.4, Jul. 28, 2016, 1 page.
European Patent Office, "Decision to grant a European patent pursuant to Article 97(1) EPC," issued in connection with European Patent Application No. 14003505.6, Jul. 28, 2016, 1 page.
European Patent Office, "Decision to grant a European patent pursuant to Article 97(1) EPC," issued in connection with European Patent Application No. 14003504.9, Jul. 28, 2016, 1 page.
United States Patent and Trademark Office, "Non-Final Office action," issued in connection with U.S. Appl. No. 14/610,854, Sep. 9, 2016, 31 pages.
United States Patent and Trademark Office, "Notice of Allowance," issued in connection with U.S. Appl. No. 14/610,833, Sep. 6, 2016, 35 pages.
United States Patent and Trademark Office, "Final Office Action," issued in connection with U.S. Appl. No. 14/610,820, Nov. 8, 2016 (40 pages).
United States Patent and Trademark Office, "Notice of Allowance," issued in connection with U.S. Appl. No. 14/610,828, Nov. 16, 2016 (36 pages).

* cited by examiner

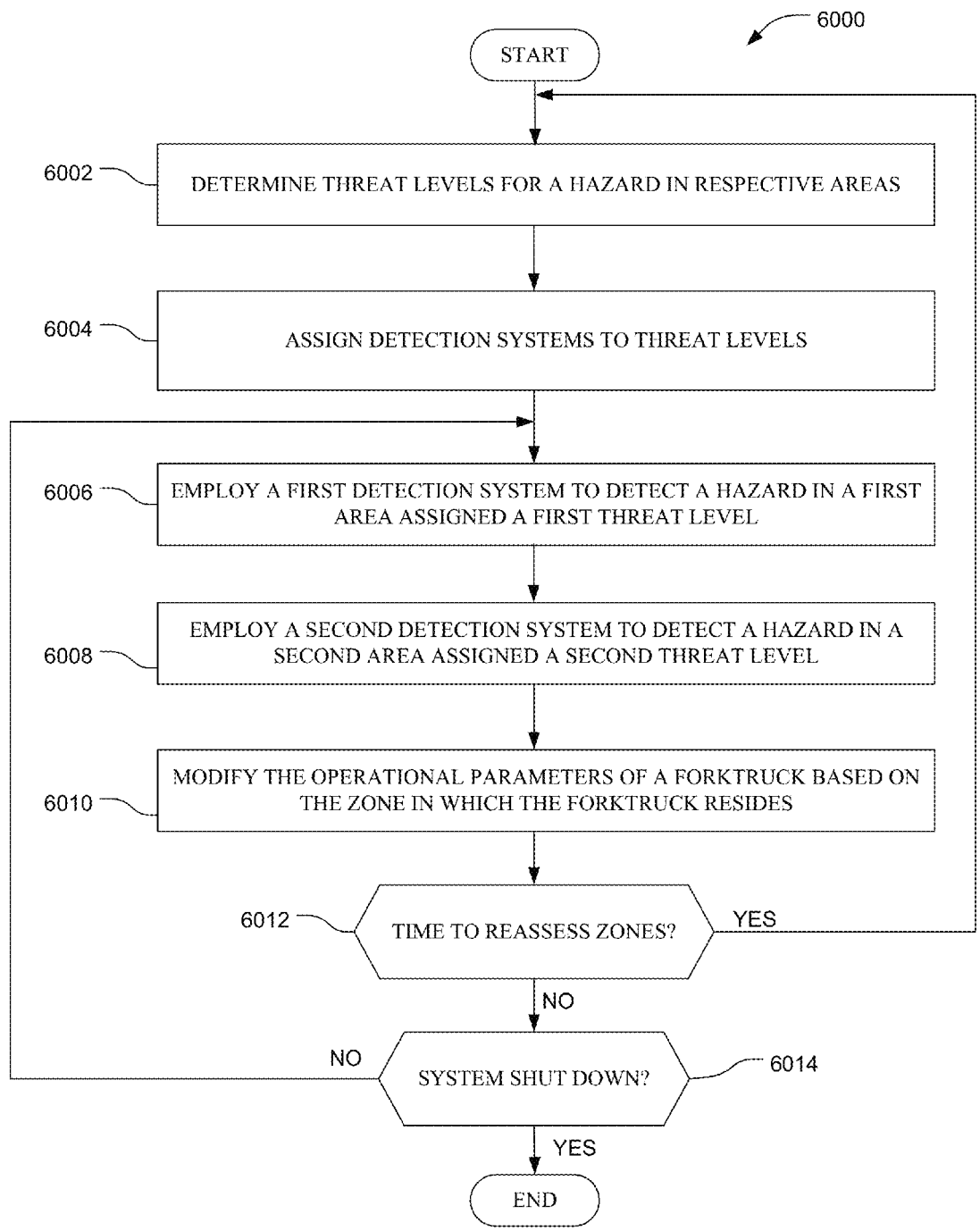

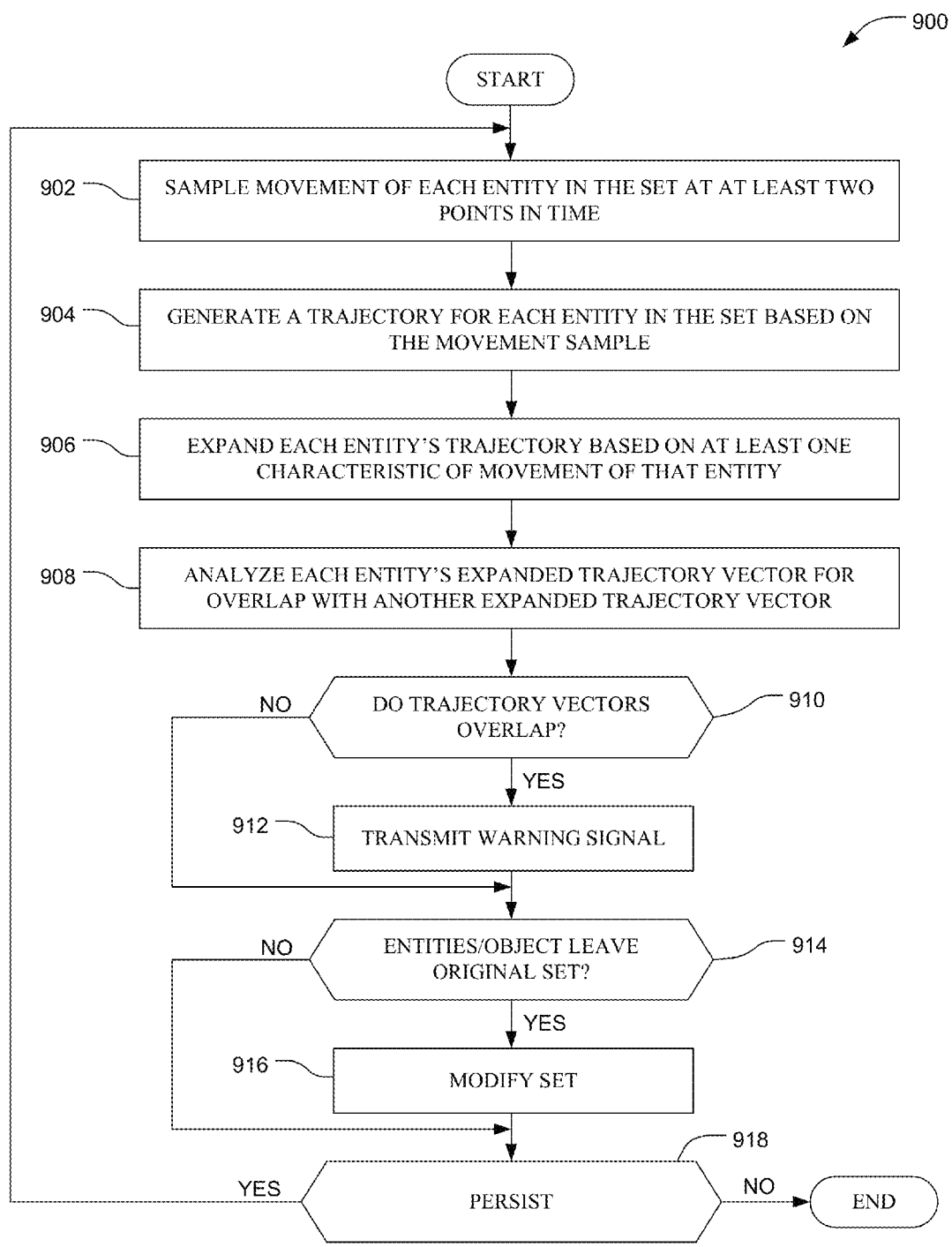

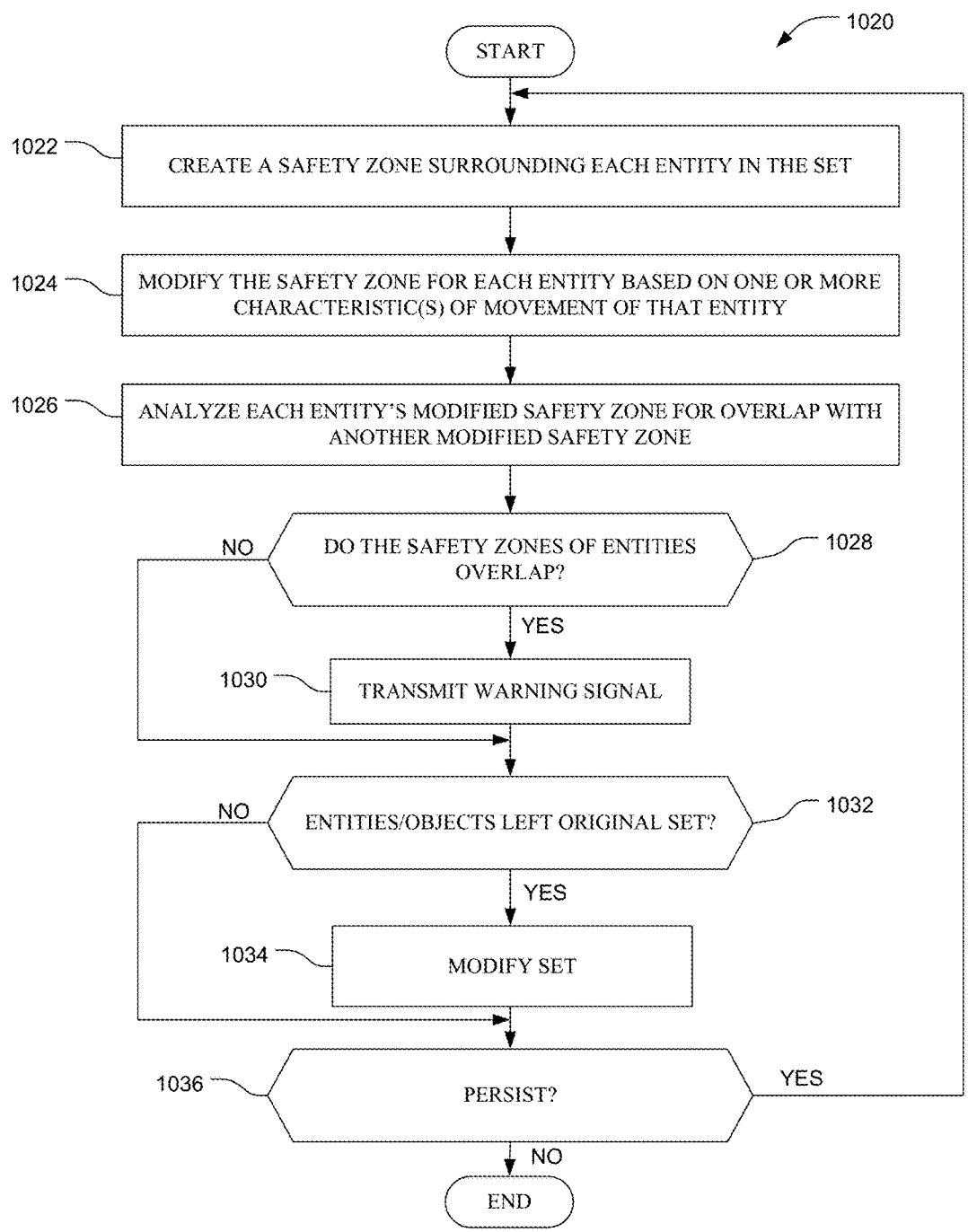

METHODS AND APPARATUS TO DETECT AND WARN PROXIMATE ENTITIES OF INTEREST

CROSS-SECTION TO RELATED APPLICATION

This patent arises from a continuation of U.S. application Ser. No. 12/844,295, (Now U.S. Pat. No. 9,230,419), which was filed on Jul. 27, 2010, and is hereby incorporated herein by reference in its entirety.

FIELD OF THE DISCLOSURE

This disclosure relates generally to loading docks and, more particularly, to methods and apparatus to detect and warn proximate entities of interest.

BACKGROUND

There are many environments where enhancing worker safety is desirable. Examples of such environments include loading dock areas, warehouses, distribution centers, and similar facilities. In addition to such places usually being crowded, noisy and full of activity and other distractions, the juxtaposition of people and vehicles (fork trucks, pallet jacks, etc.) greatly increases the potential dangers. People and heavy, moving vehicles do not consistently interact this way in other environments (e.g. on the street with defined lanes/roads for vehicles, sidewalks and crosswalks for pedestrians, stop signs, stoplights, etc.), but it is currently the status quo in the enumerated environments. As a result, accidents in which individuals are struck by forktrucks, and similar and related accidents, are all too common.

Several factors can increase the likelihood of such accidents occurring. One factor is the crowded, busy, noisy, distracting environment referred to above. The presence of such distractions can prevent an endangered individual from realizing and reacting to a dangerous situation. Ironically, one source of such distractions are the myriad lights, strobes, horns and/or buzzers intended to warn against such dangers. Another factor is the presence of blind spots. An individual walking down an aisle in such a facility is not able to see potential dangers around the corner at the end of the aisle, or at a mid-aisle break. The way forktrucks are used to load and unload trucks parked at a loading dock also create blind spots for a driver of the forktruck. Typically, a fork truck is driven forward into a trailer, and then driven in reverse to depart the trailer. While swiveling seats and/or fork truck mounted mirrors are used in attempts to minimize this problem, these attempted solutions are not completely satisfactory. Indeed, an individual that spends any significant amount of time in such a facility typically adopts the practice of stopping and looking into each trailer parked at a loading dock as he traverses from dock to dock—for fear of being struck by an inattentive or blind-spotted backing fork truck.

The current mechanisms for preventing or minimizing the severity of these kinds of accidents generally fall into two categories. The first category is personal safety items— typically some sort of apparel. Common examples include hard hats, safety glasses, steel-toed shoes or boots and safety vests. Most of these apparel items are intended to minimize the effect of such an accident. A hard hat, for example, can cushion but not prevent a blow to the head. Some safety vests are intended to help in preventing accidents, as they can be made of highly reflective or brightly-colored fluorescent material to increase the visibility of the wearer so they can be seen by a fork truck driver or other source of hazard. In general, these safety items are limited in their effectiveness in that they are passive. On the other hand, they do provide the benefit of being worn by and traveling with the person being protected.

Besides such personal safety or apparel items, the other category of devices intended to prevent or minimize these kinds of industrial accidents are warning systems. Typically, some kind of warning/signaling device (a red light, a flashing light, a strobe light, a horn, a bell, a buzzer, etc.) is activated in response to the detection or sensing of a dangerous condition. Such sensor-responsive signaling may include a light being illuminated when a piece of equipment is turned on. Other signaling might be activated by the detection or sensing of a dangerous operational condition of a piece of equipment, such as the signaling of movement of a piece of equipment representing a hazard (e.g. a backup beeper for forktrucks). Another example loading dock safety device known as a vehicle restraint is intended to engage the Rear Impact Guard (RIG) of a trailer parked and being un/loaded at the loading dock to prevent the dangerous condition of the trailer departing from the dock while being un/loaded. In such loading dock safety devices, a sensing mechanism is employed in an attempt to determine if the RIG had indeed been captured by the restraint. If so, a light inside the dock is illuminated green to indicate that the trailer is restrained and can be safely un/loaded. If, however, the sensor does not detect capture of the RIG, and inside red warning light is illuminated and/or a horn sounds to signal that it is unsafe to un/load the trailer. Other forms of vehicle restraints are designed to engage other structure on the vehicle such as the wheels, the chassis, the bogey rail, etc.

Systems also exist to attempt to warn either pedestrians or proximate fork trucks of imminent collisions between the two. While a variety of sensing technologies have been coupled with warning signaling, such systems do not fully or effectively address the situation. For example, the warnings they provide may suffer from a lack of specificity. This lack of specificity may be in regard to what the hazard is. A given facility can have so many lights, horns and sirens that it may be difficult for an endangered individual to properly associate a given warning with a given threat. The lack of specificity may also relate to who is in danger. If, for example, a sensing system is intended to detect when a person has entered into a large, designated area, several people in close proximity to the area may hear or see a warning and may all be under apprehension of danger based on that warning signal, even though only one of them has actually breached the area. Given this example, a more likely result is that all of the individuals will ignore the warning as it is unable to specify who is in danger. The lack of specificity may also apply to the location, direction, or distance (in either physical distance or temporal distance) of the impending hazard. Relatedly, the timing of the hazard may be imprecisely conveyed by the warning used—with the endangered individual not knowing if there is a generalized threat that may occur at any time, or if a given threatened harm is imminent. This unduly limits the opportunity for the threatened individual to take appropriate avoiding or remedial action relative to the threat. Additionally, an imprecise and/or constant apprehension of danger may result in the loss of productivity of the affected personnel.

BRIEF DESCRIPTION OF THE DRAWINGS

FIG. 6C is a flowchart representative of example machine readable instructions that may be executed to detect a particular hazard in different areas of a building.

FIG. 9C is a flowchart representative of example machine readable instructions that may be executed to implement a hazard discriminator that performs a predictive analysis.

FIG. 10C is a flowchart representative of example machine readable instructions that may be executed to determine the possibility of a collision between entities of interest.

DETAILED DESCRIPTION

Figure 1:
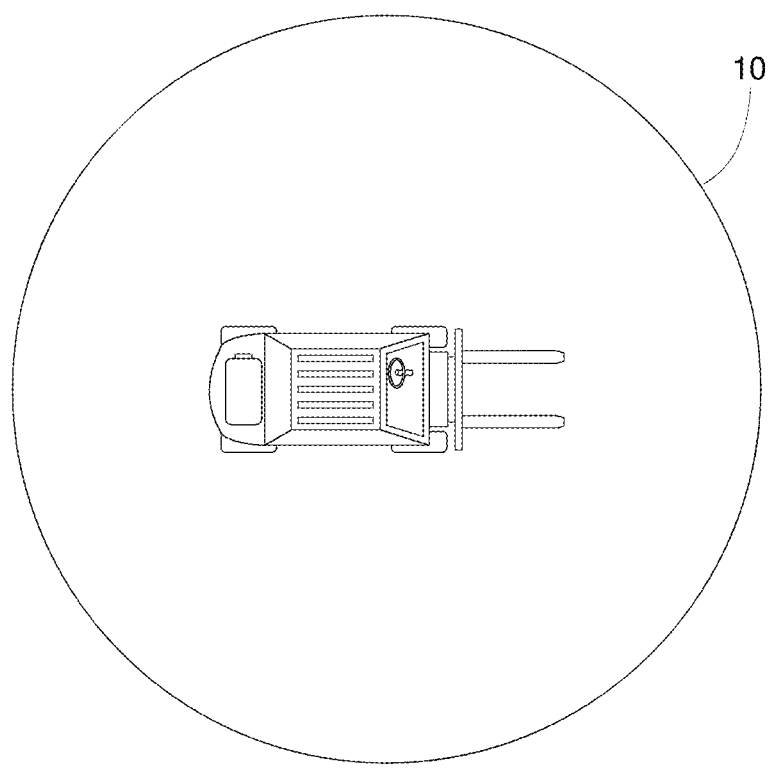
FIG. 1 illustrates an example system having an unmodulated warning zone.

A first category of sensing systems to detect or sense potentially dangerous interactions between forktrucks and pedestrians (or other vehicles, people or equipment in a facility) uses detection or sensing techniques based on proximity. In general, the sensing technology detects and/or determines when a potentially dangerous condition exists based on the proximity of, for example, a potentially harmed entity (a pedestrian) and a dangerous instrumentality (e.g. a blind intersection, or a forktruck). As used herein, such potentially dangerous (or dangerous in fact) situations will be referred to collectively as "threats". For example, a sensing system can determine threats at a fixed location such as a blind intersection. A first example system uses two ultrasonic sensors located at a corner—one orientated in a first direction or "field of range" of an approach, and the other orientated in a second direction or field of range different from the first direction or field of range. When the system detects bodies or entities of interest on both fields of range, a generalized warning is given. The detection is based on the time delay between sending the ultrasonic signal and receiving the reflected signal from a body. In another example, a system includes a sensing apparatus mounted above an intersection to scan or look down the aisles approaching the intersection (e.g., four aisles, three aisles, etc). Detection of an approaching object that is large enough (i.e. not pedestrians) causes a warning. The system can discriminate between approaching and retreating objects. Another example system uses photoeyes mounted near potentially dangerous locations in combination with reflectors or reflective tape on the forktruck. Passage of the forktruck triggers the photoeye indicating proximity of the forktruck to the potentially dangerous location and triggers general warnings. However, the current array of generalized warning and threat-communication systems have limited utility in this critical function of preventing or minimizing these potentially very hazardous industrial accidents. In these cases, of course, the warning is only generalized, and indicative of a potentially dangerous condition. Even so, such systems could have some application to more effective threat detection and communication. For example, a particularly dangerous area is the area surrounding a dock leveler when a truck is being loaded or unloaded, since forktrucks departing the truck are traveling in reverse or backward, and the operator may not have adequate sight lines to see pedestrians in the area. A system capable of determining that 1) a forktruck is in the trailer (or even leaving the trailer if a directionally-discriminatory system is used) is combined with a means for determining the presence or approach of a pedestrian to the dangerous area around the leveler to trigger a warning. This warning is specific in terms of indicating that a forktruck is coming out of the trailer. Additionally and alternatively, the warning is personally directed to the person approaching harms way. Such solutions are disclosed in a co-pending US Patent Application Publication Number 2008/0127435, which is incorporated herein by reference in its entirety.

There exist many examples of proximity sensing systems for moving objects such as forktrucks relative to hazards such as pedestrians. In some such systems the potentially endangered personnel are provided with some form of detector that can determine the signal strength of a signal (typically an RF or other electro-magnetic signal) sent by the dangerous instrumentality (e.g. a forktruck). Detection of a sufficient signal strength causes an alarm, as it is indicative of the dangerous proximity of the forktruck. Several forms of electromagnetic radiation are used for this type of ranging system. In one known system, a rotating infrared beacon is placed on top of the forktruck, and infrared detectors are placed either in fixed locations or on moving personnel. When there is close enough proximity of the beacon and detectors to trigger detection, warnings are generated.

In another example, a magnetic field is generated by a field generator on a hazardous mobile machine, and pedestrians carry detectors for detecting the presence and strength of that field. This system has the benefit of both the transmitters and receivers being wire loops that can create magnetic fields for applied current, or detect magnetic fields to generate detectable current. An example use of RF signals includes both pedestrians and the dangerous instrumentality having transceivers. Further, a signal processing unit on the hazardous mobile machine determines the distance of a pedestrian (in one of three ranges based on signal strength) and is in communication with a control unit that controls certain hazardous aspects of machine operation based on the proximity of the pedestrian relative to the machine. Such functionality could apply to the systems of this disclosure, in those aspects of forktruck operation could be controlled based on data about the proximity of pedestrian or other hazards relative to the hazardous mobile machine. This could be particularly beneficial in the context of potential collisions occurring around "blind corners"—since an area-generalized warning might not reach the affected pedestrian—slowing or stopping the forktruck for a perceived hazard could be beneficial. Another RF based system uses a tuned optical transmitter to create a cone-shaped warning zone below a moving hazard. Another system uses an RF signal on the dangerous equipment to send an interrogation signal. Any pedestrian receivers in appropriate range (based, for example on signal strength) send back their identification (ID) associated with that particular receiver or pedestrian. A processor keeps a table of authorized and unauthorized ID's within the safety zone of the machine. For authorized workers, no action is taken—for unauthorized workers warning signals are generated on the vehicle and sent to the endangered individual. This approach seems beneficial for eliminating some "nuisance" aspects of warning people who do not need to be warned—although making that discrimination would require processing as will be discussed below. Another example RF based system enables the dangerous instrumentality to transmit different signals (to be detected by affected pedestrians) for different threats, which differing signals can be discriminated by the pedestrian receiver, and which can result in different warning (audible, visual, tactile) for different threats.

Figure 2A:
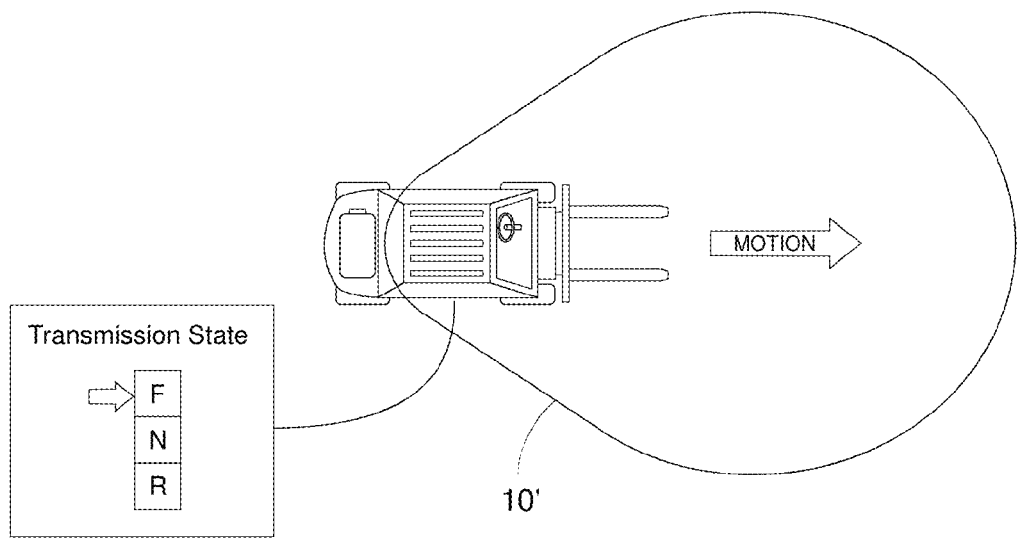
FIGS. 2A and 2B illustrates an example system having a modified warning zone.
Figure 2B:
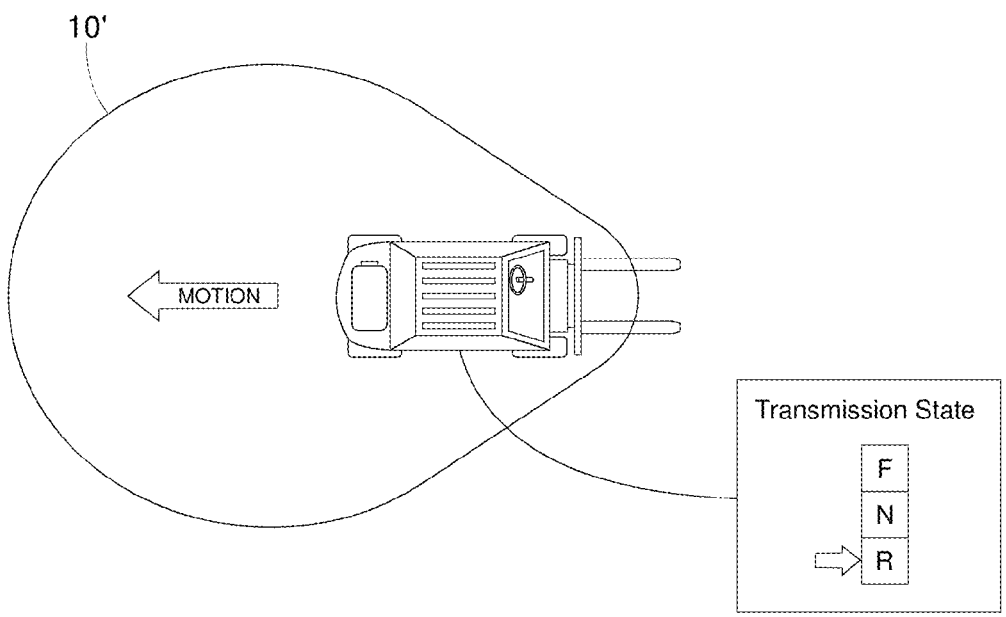

Several of the examples referenced above disclose modifying the signal being generated by the dangerous or hazardous mobile instrumentality to convey more threat-specific information. An application of this example is shown in FIGS. 2A and 2B which disclose changing a shape of a transmitted warning signal from a forktruck based on the mode of operation or movement of the forktruck, for example, a gear selection of the forktruck (e.g., forward, reverse, neutral). An indication of the gear selection from a detector is provided to a transmitter carried by the forktruck itself, which creates and/or transmits a proximity signal that will be received by a receiver carried by a pedestrian, which receiver is capable of determining the signal strength of the received proximity signal. The detector, for example, may include a sensor to determine a property of vehicle movement such as, for example, whether the forktruck gear selector is in the forward position, neutral position and/or the rearward position and produce an output or signal representative of the vehicle movement property (e.g., the gear selector being in the forward position). The signal is modulated or generated based on that gear selection (and/or other indication of activity such as movement) of the forktruck so as to create an output or warning zone indicative of the mode of movement or the direction the forktruck is traveling. FIG. 1 shows an unmodulated warning zone 10 that has a circular cross section since the transmitter generates a field that radiates in all directions. As seen in the FIGS. 2A and 2B, a warning zone 10' is biased toward the front of the forktruck when it is moving forward, and biased to the rear, when the gear selector is in reverse. This may help avoid nuisance alarms—for example to a pedestrian who is positioned behind a forktruck that is moving forward. As used herein, the terms transmitter and receiver should be broadly construed to encompass at least the various forms of radiation (magnetic, RF, optical, infrared, etc.) described above and below.

Figure 3A:
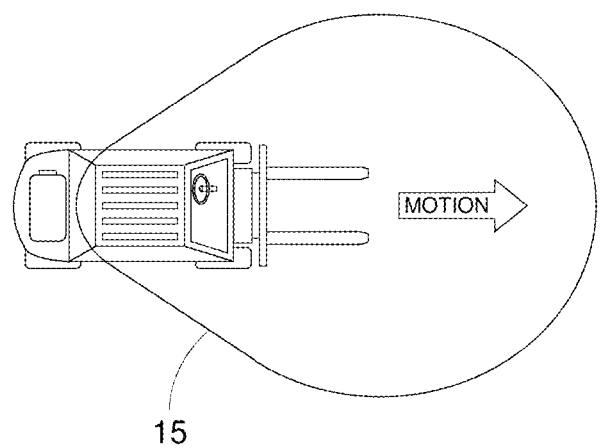
FIGS. 3A and 3B illustrate an example system having another modified warning zone.
Figure 3B:
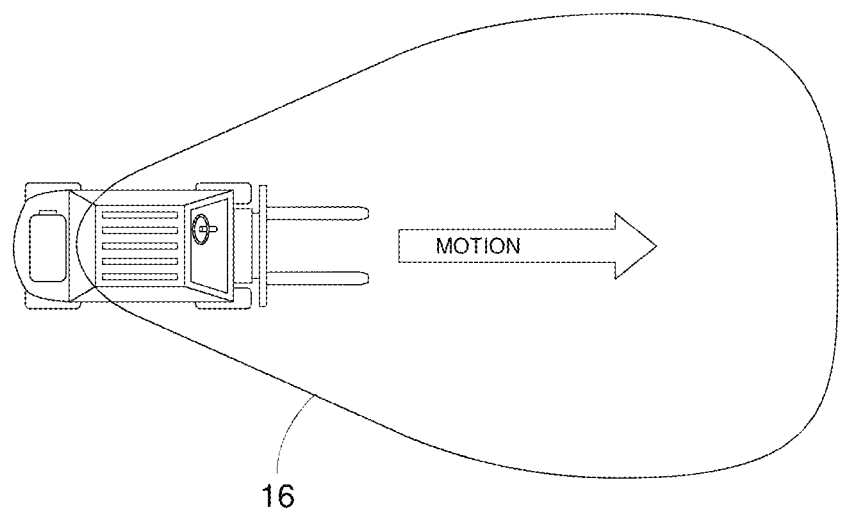

Similarly and relatedly, the proximity signal generated by the transmitter on the forktruck is modulated by the speed and/or traveling direction of the forktruck to dynamically modify the shape of the proximity signal's "field" or warning zone. A faster-moving forktruck creates a larger zone, a forward-moving forktruck creates a zone shape biased to the front of the forktruck, and vice-versa for a backing forktruck. Such an example is depicted in FIGS. 3A and 3B, with FIG. 3A showing the warning zone 15 for a relatively slow-moving forktruck, and FIG. 3B showing the warning zone 16 for a relatively fast-moving forktruck. For a pedestrian outside either warning field of FIGS. 3A and 3B, but being approached by such forktrucks, the field or warning zone of FIG. 3B would result in receiving the signal earlier and with a relatively larger signal strength as compared to that of the signal from the slower-moving forktruck as in 3A.

Figure 4A:
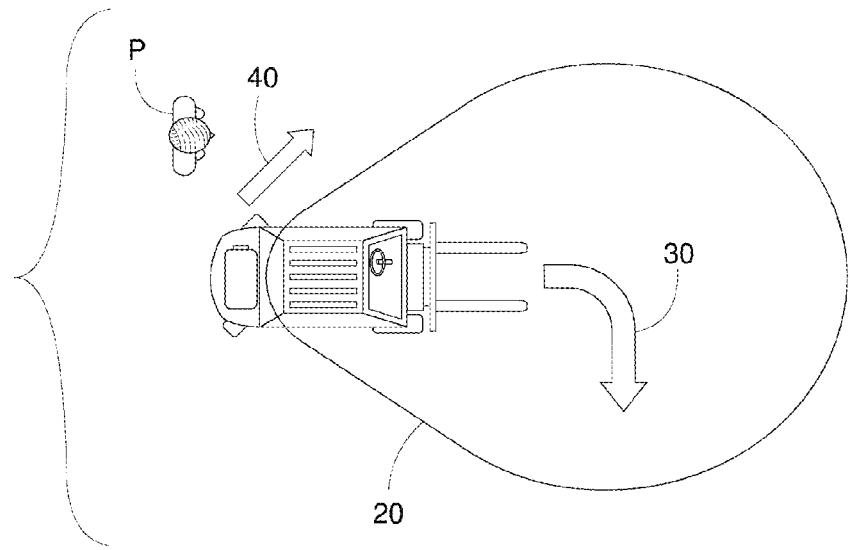
FIGS. 4A and 4B illustrate an example system having yet another modified warning zone.
Figure 4B:
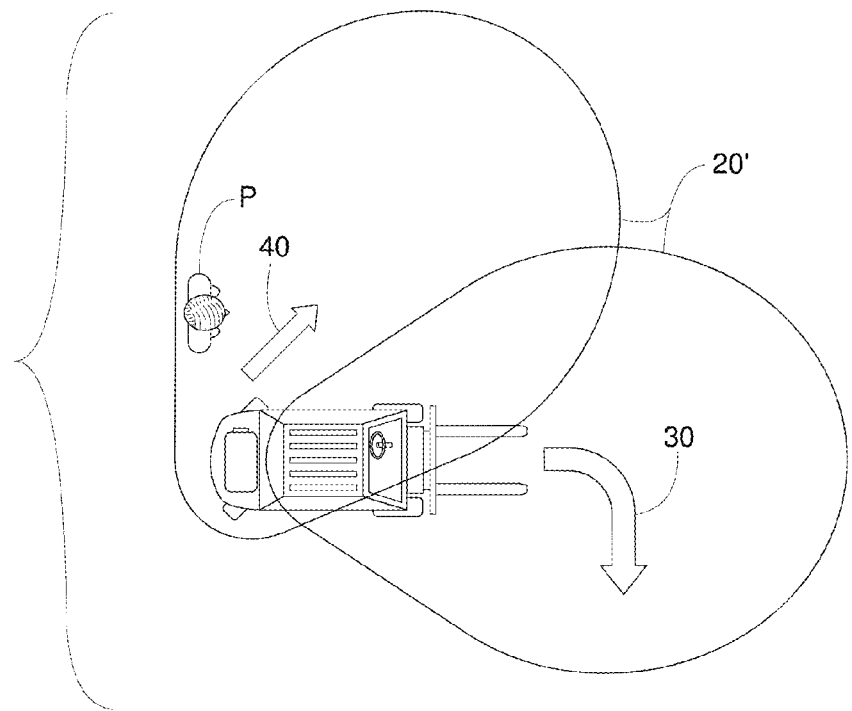

The example of modulating the "warning field" for a forktruck based on operational parameters such as gear selection or relative speed is enhanced by using the position of the forktruck steering wheel as the source of such modulation. Forktrucks may be particularly dangerous by virtue of the fact that they are steered by the rear wheels as opposed to the front wheels as we are commonly used to from other vehicles (e.g., automobiles, etc). Accordingly, the movement or steering action of a forktruck can be potentially dangerous to an unsuspecting pedestrian. Modulating the "warning field" of a forktruck based on the steering wheel position or rotational direction can provide effective warning signaling to a pedestrian unfamiliar with this movement. A sensor monitors either the absolute position of the steering wheel, or the direction it is being rotated, and the shape or orientation of the warning field is modified based on that signal. In the example of FIG. 4A, a forktruck warning field 20 that is not modulated by a steering signal is shown. The curved arrow 30, and the straight arrow 40 indicate that when the forktruck is turning to the driver's right, the steered rear wheels will actually swing toward the depicted pedestrian (to the driver's left) who may not be familiar with this unusual motion. In the example of FIG. 4B, however, the warning field 20' is shown in both a "normal" orientation (extending in a forward direction from the forktruck), but also in a counter-clockwise rotated orientation due to the fact that the forktruck steering wheel has been turned to the right (meaning the rear wheels will be turning to the left). The modulated warning field may include only the second, rotated lobe or both. In addition, the warning zone may include a third lobe directed in a clockwise orientation relative to the forktruck to warn someone forward of the vehicle of the impending turn. Rather than the warning signal being divided into lobes (which is done here for purpose of illustration), a single field shape could be used to provide an indication of the soon-to-result turning movement of the forktruck. The modulation of the warning field for a turning forktruck may be performed in advance of the actual movement to give a prospective quality to the warning by using the rotational position and the rotational speed of the steering wheel as a modulation signal. An alternative is to provide the forktruck with a turn signal switch such that activation of the right turn switch by the forktruck operator (trained to activate the switch several seconds before initiating the turn) would serve as the trigger for modulating the warning field in the manner of FIG. 4B. Thus, systems or sensing apparatus to modulate a proximity-based signal with threat-relevant information (e.g. the status of the forktruck gear selector, or its speed or direction) to allow more effective warning based on that threat-relevant information are disclosed herein.

Additionally or alternatively, the modulation of the proximity signal not only changes the shape of the field, but also encodes additional information. For example, if the field is modified according to the speed of the forktruck, the speed is encoded into the modulated signal. A detector/receiver configured to detect and/or receive the presence of the signal and also decodes the speed of the approaching hazard, thereby providing threat-relevant information that is used to appropriately modify the warning signal (e.g., different levels of warning for different levels of threat). In another example, the proximity signal can be configured to convey information about the hazard to multiple transmitters on the forktruck, for example, one facing in the forward direction and one facing in the backward direction. The two transmitters send different proximity signals, both of which could be received by a pedestrian receiver or detector. The detector may provide an output indicative of a vehicle in proximity to the pedestrian. An output may be decoded or generated as a warning signal of a forktruck approaching in either a forward or rearward direction. Given the sight-line limitations imposed on a forktruck driver while traveling in reverse (backing up), a pedestrian detection of the rearward direction signal could create a more urgent warning than detection of forward movement direction signal. Modulation of the proximity signal to indicate speed could also be achieved by increasing the repetition rate of the proximity-detecting signal with speed. Instead of a constant field being emitted, bursts are emitted, and the burst rate increases with vehicle speed. The detector would thus be able to determine based on the burst rate how fast the forktruck was approaching. If desired, different warning signaling for different speed ranges could be provided to the pedestrian.

Figure 5:
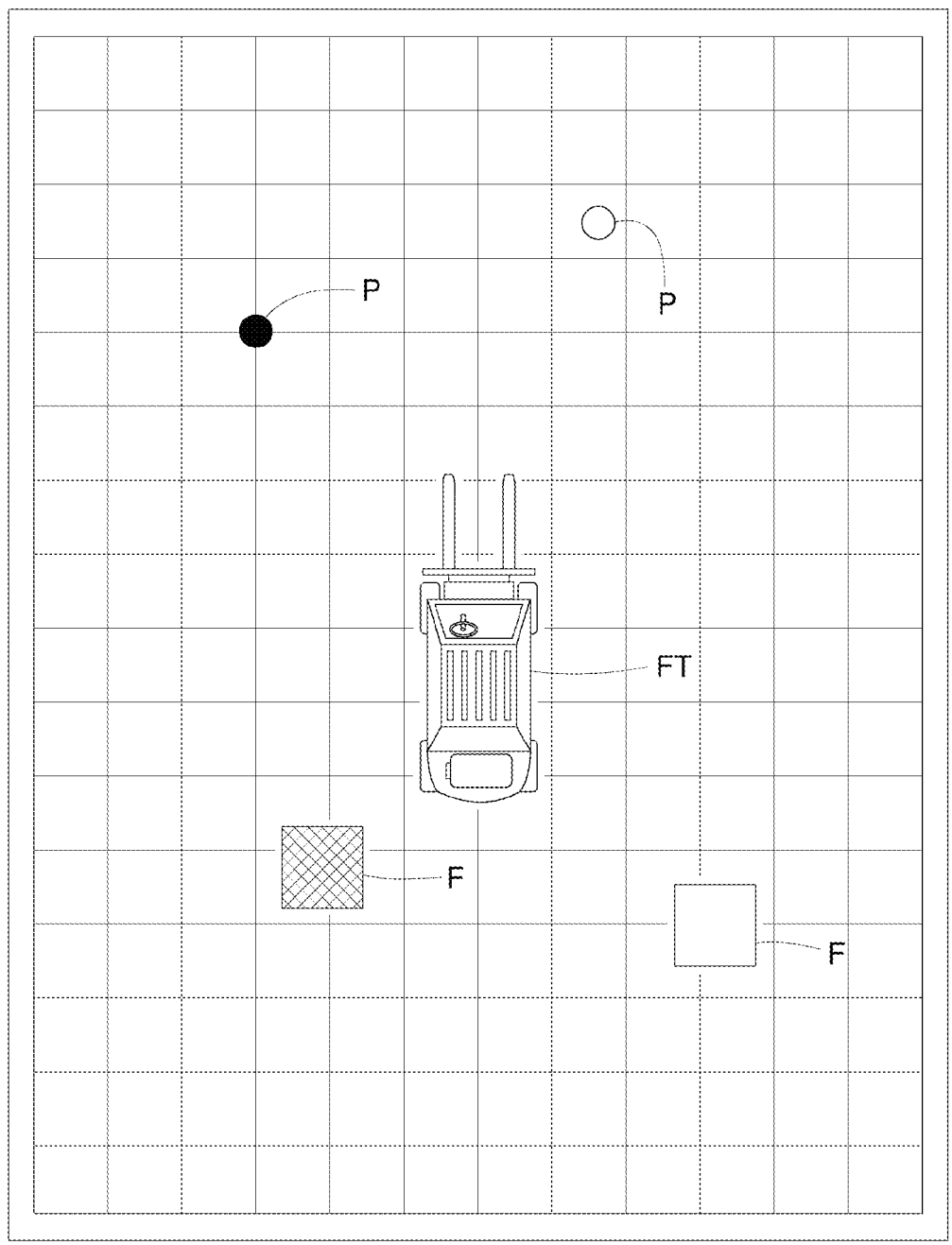
FIG. 5 illustrates an example graphical display of an example system described herein.

The proximity-based systems described so far generally utilize or rely on signal strength for determining the existence or level of a threat. While such proximity can be useful information to a threatened pedestrian, proximity-based systems can be enhanced by adding a component of directionality by providing both distance and directional information between a dangerous instrumentality and a potentially-affected pedestrian. In an example of such a system, a forktruck includes a Directional Antenna Array comprised, for example, of three separate antenna spaced at a known distance and orientation. The array allows shaping of an interrogation signal that will be sent out by the forktruck to any pedestrian transponders in range. That shaping is indicative of the direction, speed, and/or other property of the forktruck, along the lines referred to above. Receivers or detectors carried by pedestrians (illustratively in the form of portable badges) are capable of detecting the interrogation signal and responding (again, perhaps only when the interrogation signal is of adequate strength). The responsive signal is received by the array, where the multiple antennas allow directional resolution of that received signal via, for example by triangulation, or other similar techniques known to those skilled in the art. Combining such directional information with a technique for determining distance (e.g. measuring the time delay between transmission of the interrogation signal and receipt of a responsive signal within some maximum allowed time range to avoid nuisance detections), allows a processor associated with the system to determine the position of the pedestrian with some specificity since one would know its distance and direction. The determined location of pedestrians (or other objects or hazards capable of having transponders) is then displayed to the forktruck operator on a graphical display, as shown in FIG. 5. The graphical display of FIG. 5 shows the forktruck FT and potential hazards such as, for example, circles P representing pedestrians and squares F representing other forktrucks. Processing the position information received relative to the forktruck can also used to provide threat-specific warning to the forktruck operator (e.g. a auditory warning of the direction and distance or time to potential collision with the detected pedestrian), or take corrective action (e.g. applying the forktruck brakes to prevent collision). Given the existence of a communication channel, the processor can also formulate and send threat-specified warning to the affected pedestrian (for example, different levels of warning based on the proximity and/or direction of the forktruck) and have discrimination so as to avoid warning unaffected pedestrians (e.g. not warning close-by pedestrians that the forktruck is moving away from them).

Figure 6A:
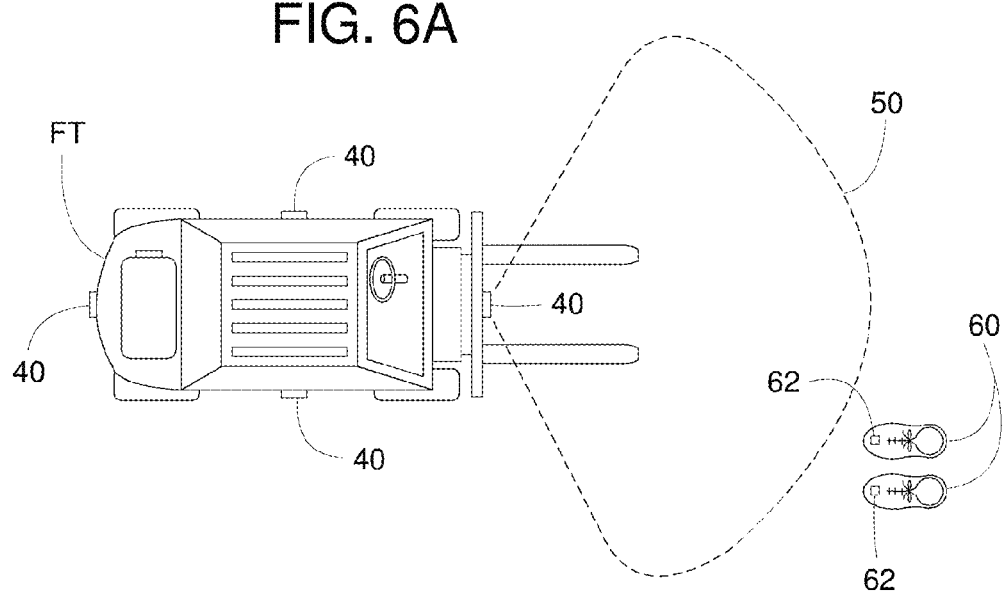
FIGS. 6A and 6B illustrate an example proximity-based detection system described herein using visual light to create a warning zone.
Figure 6B:
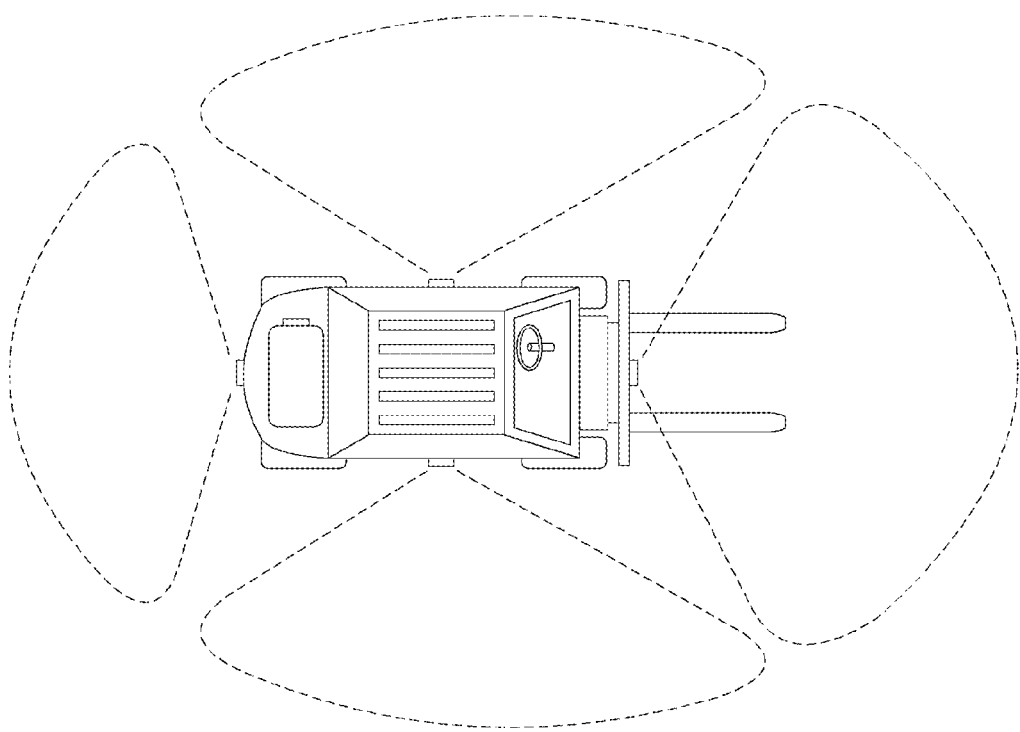

Another example of a proximity based detection system for hazards uses visual light to create a warning field that can be detected by sensors, but that is also visible to the eye. As depicted in FIGS. 6A and 6B, a forktruck FT is fitted with one or more light sources 40. Illustratively, four light sources (front, back, left and right) are provided, with the capability of projecting both red and green light. For normal operation of the forktruck (i.e. when it is driving in a generally forward direction through the facility with no detected hazards), the forward light source 40 is illuminated green to project a cone-shaped signal 50 on the floor in front of the forktruck. In this case, the front light is illuminated as the forktruck is moving in a forward direction. Alternatively, a different shape is used for the forward signal including a forward signal the shape of which is modulated by the speed of the forktruck (as in previous examples, the shape would extend further forward or be larger in the forward direction for a faster forktruck speed in that direction). One way to achieve this modulation is to provide the light sources 40 with adjustable apertures, lenses and/or adjustable positioning so that the shape and direction of the light sources can be modulated based on inputs from other sources such as, for example, a speed and direction indication received from the forktruck, although other sources could be used. In another alternative, shown in FIG. 6B all of the light sources are illuminated green in this condition of the forktruck moving generally forward through the facility, in effect creating a "zone of safety" around the forktruck. The green illumination (either only in the forward direction, or surrounding the forktruck, or taking other shapes) serves as a visual indication to the forktruck driver that the path he is pursuing is "safe" (no pedestrian interactions have been detected), and also as a visual indication to surrounding pedestrians that the path of the forktruck is "safe" insofar as close-proximity pedestrians have not been detected. The projection and ability to perceive these "light signal" may be enhanced by painting the floor of the facility with a reflective paint, or by adding reflective grit to the concrete floor when poured.

The light projected from the source(s) 40 can serve the dual function of not only providing signaling, but also of being a warning field that can serve as the basis of proximity-based sensing of hazardous conditions. As one example of such a system shown in FIG. 6A, the workboots 60 of the pedestrians in a facility are fitted with light sensors 62 that are designed to detect light of a specific wavelength or wavelengths and above a designated intensity. In this example, the detectors are designed to detect the green and red lights projected by the light sources 40 of the forktruck FT of FIG. 6A. Accordingly, if a forktruck progressing through the facility gets close enough to a pedestrian (or other hazard, such as a similarly equipped stationary object) to be potentially dangerous, the light sensor 62 will be activated by the light from one or more of the light sources 40. This activation can serve as the source of a properly formulated warning signal to the affected pedestrian such as an audible warning that there is a forktruck in close and potentially dangerous proximity. In an enhanced system of this kind, pedestrians and forktrucks are fitted with communication devices to allow signaling between them. In such a system, the detection of the warning field by the light sensor 62 would also result in a signal being sent to the forktruck indicative of a pedestrian in potentially dangerous close proximity. The receipt of such a signal would then cause some or all of the light sources 40 on the forktruck to turn to the red color, thus projecting a red color on the floor surrounding or adjacent the forktruck. This red color serves as a visual indication to the forktruck driver of a potentially hazardous situation. Moreover, it serves as an additional visual signal to the affected pedestrian (or other pedestrians in the area) that a dangerous condition exists. Since the warning field now surrounding or adjacent to the forktruck is red, and because the light sensors 62 illustratively in the workboots of the pedestrians can also detect red, such detection by sensors 62 may be indicative of an imminently dangerous situation (since the changing of the light warning field to red was already triggered by a detection of a pedestrian within some predefined unsafe proximity). The result of such detection would then be a specialized warning intended to convey the immediacy of the threat as opposed to a more generalized warning to raise the pedestrian's awareness. Similarly, if the detection of the red light by a light sensor on the pedestrian is communicated to the forktruck, action could be taken such as flashing the warning field surrounding or adjacent to the forktruck to provide a visual indication to forktruck driver and pedestrian alike of the immediacy of the danger.

The examples described above using visible light as the basis of a proximity-based hazard sensing system can be applied or implemented with other systems. For example, a particularly common industrial accident is a forktruck running over a person's foot, which most often happens when a stationary forktruck near a pedestrian begins moving. To address this specific situation, a forktruck could be outfitted with light sources 40 like those shown in FIG. 6A. In this example, however, the light sources could be a single color, or even a non-visible light (e.g. an infrared light), and would always be projected in a warning field surrounding the forktruck, such as a circular warning field. Alternatively, since this accident is most common with a stationary forktruck, the warning field could only be projected when the forktruck is stationary (either by detecting a lack of motion, or by determining that the gear selector is in the neutral position). In either event, the workboots of pedestrians are equipped with light sensors designed to detect the wavelength of light projected by the light sources above a given illumination level indicative of a predetermined unsafe (or potentially so) proximity to the forktruck. Whenever a pedestrian is close enough to the forktruck for the warning field to be sensed by the light sensors, a warning signal may be provided to the pedestrian, the forktruck or both. This may be particularly effective if the warning field is only generated when the forktruck is stationary, as receipt of the warning signal by the pedestrian indicates that he is close to the forktruck, and preferably raise his awareness of the situation to be cautious about the forktruck beginning to move. As a further enhancement, a communication channel between the pedestrian and the forktruck would receive an indication of the light sensor detecting the hazardous condition—resulting in corrective action. For example, the forktruck could be prevented from moving if such detection occurs, or a warning signal could be provided to the forktruck operator of a pedestrian in dangerously close proximity. The operator may be able to visually identify the affected pedestrian and override the warning to begin moving the forktruck, or the system could be latched in a way that movement of the forktruck is not possible until the pedestrian moves away from the warning field of the forktruck (e.g., to a far enough distance away from the forktruck) so as to not be endangered by the forktruck then moving.

The signaling aspect of the visible light based system can also be applied in other ways. While the forktruck projecting light on the floor was used both for visual signaling and for hazard detection by the light sensors on the workboots, the example is not so limited. Indeed, the projection of green and red (or additional color) lights around the forktruck could be applied irrespective of what system is used for the sensing of hazards. Again, such signaling is beneficial in that it can provide the same indication of hazard, vel non, to both the forktruck operator within the colored field of light, as well as the pedestrian (or other forktruck operator) without that colored field of light.

The use of color can also be applied in a different way to achieve some of the safety goals of this disclosure. Rather than having a forktruck carry light sources, however, this example divides a given facility into different zones which have differing safety levels. One zone may be a generally open area in the middle of a warehouse space where typically only forktrucks are present, and few pedestrians enter. Another zone may be the loading dock area of a warehouse, where pedestrians and forktrucks typically both reside. A third zone may be a corridor where forktrucks are present that is just beyond doors into meeting rooms, offices, or other people-only spaces (these can be particularly dangerous corridors). The floor of the different zones are each painted a particular color—chosen to be indicative of the danger level vis-à-vis a particular hazard—in this example pedestrian-forktruck collisions. Since the first, open zone described above is generally a low-danger area relative to such collisions, the floor of that area may be painted a first color, illustratively blue. The loading dock area or zone is of a relatively higher danger level, and might thus be painted yellow. Finally, the zone or corridor outside the meeting room area is potentially highly dangerous and might thus be painted red. It should be noted for the purposes of this discussion that the term "paint" or "painted" should be broadly construed to include not only actual paint, but also, for example adding a coloring agent, such as a colored grit to concrete as it is poured or any other way to achieve the desired effect of coloring the floor a particular color. The painting or coloring of the floor in the various areas thus serves as a visual indication to pedestrians and forktruck operators alike about the potential threat level in that area. Alternatively, a zone-based indication using color could be provided by modulating the colors of overhead lights in the various zones, to similar effect.

In addition to providing a visual indication, the floor coloring can also be used to modify the operation of the forktruck to take the potential threat level into account. In that regard, the forktruck can be fitted with a color detector that can detect whether the forktruck is in a "low-danger" blue area, a "raised danger" yellow area, or a "highly dangerous" red area. Based on the type of zone in which the forktruck then resides, operational parameters of the forktruck can be modified. For example, in a blue zone, no modifications might be made. In a yellow zone, however, a speed limitation may be imposed on the forktruck. In a red zone, the forktruck might become inoperable upon entering the zone until a particular safety protocol is carried out and verified.

The differing zones could also be used to modify the operational parameters of other systems besides just the forktruck. Different sensing mechanisms for detecting hazards could be used in different zones. For example, a robust, sophisticated hazard detection system might require large amounts of electrical or computing power to be effective. If such a system is carried with a pedestrian, power consumption is an issue, as a power source such as batteries, and a computing source such as a processor must also be carried. Accordingly, to limit power consumption, it is desirable to only use this system in high-danger areas. If the pedestrian carried a color detector, some example systems are programmed to only activate and power the hazard detection system when the pedestrian is in a high danger zone (e.g., the red zone), and to use different hazard detection system(s) in less dangerous zones (e.g., the blue zone). Some examples apply the same approach to the forktrucks or to providing warnings in which different types of warning are presented to potentially endangered actors depending on which level zone the actor is in. It is also the case that "zones" could be established in other ways besides the coloring of the floor in given zones. Generally, zones may be provided in a facility according to the potential danger related to specific events (such as forktruck-pedestrian collisions), and that operational protocols, hazard detection schema, threat communication schema, etc., can be modified based on the zone of activity or interaction.

FIG. 6C is a flow diagram representative of example machine readable instructions 6000 that may be executed to implement a system to detect and/or warn of hazards in different ways for different areas of a building. At block 6002, the system determines threat levels for a hazard in respective ones of different areas of a building. For example, the different areas may be "highly dangerous" areas, "relatively low dangerous" areas, etc. This determination can be made based on historical data (e.g., number of accidents in a given area), empirical data (e.g., types of locations that are expected to have heightened risk of collision), or on manual input (e.g., rankings). Irrespective of how the threat levels are assigned to areas, the system assigns two or more different hazard detection systems for use in different areas of the building (block 6004). For example, a first detection system may have a first ability to detect a particular hazard and a second detection system may have a second ability different from the first ability to detect the particular hazard (block 6004). For example, the first detection system may be a robust, sophisticated hazard detection system to be used in building areas identified at block 6002 as relatively high danger areas and the second detection system may be a less sophisticated (and likely less expensive in costs and/or computing resources) hazard detection system that may be used in relatively low danger areas as identified at block 6002. Once the systems are deployed in accordance with the assignment made at block 6004, the system employs the first detection system to monitor for the particular hazard in a first area assigned a first threat level (block 6006), and the system employs the second detection system to monitor for the particular hazard in a second area assigned a second threat level (6008). In some examples, the system modifies the operational parameters (e.g., limit the speed) of a forktruck based on the area in which the forktruck is located (block 6010). For example, when entering the first area (e.g., an area considered to be a relatively high threat area), the robust first detection system may have the ability to automatically enforce a speed limit via an electronic control signal on the forktruck or may send a suitable warning to the forktruck that it is in a high danger zone.

At block 6012, the system determines if it is time to reassess the zone threats assigned to the areas. If so, control returns to block 6002. If not, control advances to block 6014.

At block 6014, the system determines if it has received a command to shut down. If so, the instructions of FIG. 6C terminate. Otherwise, control returns to block 6006 to continue to monitor for threats.

Any or all of blocks 6006 and 6008 may be implemented by FIG. 4C.

Other ways of determining "zones" of different threat levels can also be employed. For example, one zone may be considered more dangerous than another based on population or traffic density—a higher density arguably representing a greater threat. Creating zones based on population density can be done statistically (such as by monitoring areas over time and assigning densities to various areas based on the results), or dynamically such that the area of a more dangerous "high density" zone can change over time to reflect changed circumstances in a given parameter like population density. There also may be a temporal component to a given zone being considered more or less dangerous. For example, an operation that only loads trailers on third shifts, the loading dock may only be designated as a "high risk" zone during this time, and be designated "low risk" at other times.

At least some of the sensing systems described above rely primarily on signal strength to determine proximity, and thus the existence of a danger. In some cases, the proximity sensing is enhanced by signal processing to indicate direction as well as distance to the hazard. Some processing of these signals to discriminate among the level and immediacy of threat has also been described. Even so, a system relying on relative position data has potential limitations on resolution, accuracy, timeliness, etc.—although with the advantage of a relatively inexpensive implementation. A system that would allow more accurate and more absolute determination of position, direction, velocity, etc. might provide a higher fidelity of warning, although likely at an increased cost in terms of both component cost and system complexity.

Absolute Location Sensing

Other example systems include absolute location technology for enhancing the determination of proximity of a dangerous instrumentality (e.g. forktruck) and a threatened object or person (e.g. a pedestrian). In such systems, both entities typically have the ability to determine their absolute location via, for example, Global Positioning System (GPS) technology and/or one or more other technologies. The acronym "AL" will be used herein as a general term for such absolute location systems. Knowing the absolute location of both entities allows their proximity to be determined, and appropriate action taken (e.g. hazard warning) if that proximity is indicative of a hazardous situation. Accordingly, the first example system described herein are based on proximity (in terms of determining threats) enhanced by AL technology. For example, in one such system, both an earth moving machine and objects in its vicinity (vehicles, pedestrians) have AL capability. A communication channel exists between the machine and the objects through which the objects transmit their self-determined location to the machine. A processor on the machine translates the location information into a graphical depiction of the machine and the objects in proximity. The objects can also transmit an identifier, which allows not only their position, but an indication of the type of object they are to be shown on the graphical interface. In this case, the operator, armed with this information, is empowered to take appropriate action based on the represented proximities. This system may also be configured to determine the accuracy of the position location of the object, and modifying the display based on that information—lower accuracy of position resulting in the object being depicted as larger and vice-versa. Additionally or alternatively, the system can modify the display based on other information about the object. For example, if a unique identifier is provided by the object, the machine (in this example) could maintain look-up information (e.g., a look-up table) about that object such as, for example, their authorization to be in certain areas, or in certain proximity to a forktruck, the level of safety training received, whether that person is a supervisor or employee with heightened awareness of hazards, whether that person has been in a high number of accidents, etc. The display could then be modified based on this information, for example, someone with authorization is depicted as small (since their authorization suggests adequate training on safety issues and thus a reduced risk relative to other less-trained pedestrians), while the novice or person prone to accidents would receive a larger icon (indicative of requiring a larger personal safety zone given his status). Furthermore, the system could be enhanced by also providing threat-specific information about the proximity or potential for danger back to the affected objects, as will be discussed in more detail below in the section regarding communication.

Another example system using AL having dangerous instrumentality (typically an emergency vehicle, which is not necessarily dangerous on its own, but is when en route to an emergency and requires a cleared path) can itself determine the nature of the safety zone it needs to create around it (for example, based on its location, speed, direction, course to the emergency, etc.) and broadcasting a signal with such information. Its ability to formulate and broadcast such a message is facilitated by the presence of an AL system. Accordingly, the broadcast signal will typically include AL-type coordinates delineating the safety zone surrounding the emergency vehicle and extending along its projected path, on either a temporally static or dynamic basis. The receiving entities also possess AL capability. They thus receive and decode the broadcast signal, which includes information about the boundaries of the danger zone, and determine based on their then-current AL position whether or not they are in the danger zone. Appropriate action can then be taken based on that determination (e.g. a warning signal generated). Given the existence of AL technology in these systems, significant levels of sophistication are possible. For example, one system showed the receiving entity as generating specific danger-averting directions to affected vehicles in the path of an emergency vehicle ("forktruck approaching from the north behind you, pull to the left and stop" "forktruck approaching you from ahead, proceed with vigilance" etc.). As will be described below, such threat-specific warning/direction is desirable, giving a "personal" aspect of the personal safety zone. Since the broadcast warning signal can be created (or modulated) based on threat-specific information, and since the receivers can be programmed to know their own status and position (based on AL), the sending instrumentality can effectively create multiple zones simultaneously. In the example of pedestrian/forktruck interaction, the forktruck sends information based on its speed, direction, and course identifying a dynamic danger zone. Additionally, the forktruck could also send that information with one threat level for certain kinds of personnel (e.g. managers, supervisors, highly-trained individuals, and/or other employees who are authorized to be in an otherwise dangerous locality based on the current task they are performing), and another, higher threat level for other personnel. Moreover, the size and shape of the two zones just referred to could be chosen to be different—presumably a larger safety zone for less-trained personnel. As mentioned, several of these example systems included the ability to take the route to be traveled into account in creating the shape and size of the warning zone. Such functionality is very desirable in the context of forktruck/pedestrian safety as a significant risk in this application is created by narrow, blind corridors and corners, for instance between racking. If the processing capability on the forktruck can determine or account for the racking layout relative to its own current or projected course, that layout (and attendant increased risks) could be figured into the logic of formulating the nature of the broadcast danger zone. Further, the broadcast signal could, in appropriate circumstances, include some kind of indication that there is not only a hazard, but that it involves a blind corner or alley allowing a heightened warning or corrective mechanism to be sent or conveyed to the recipient once the signal is decoded. Such heightened level warnings are significant in this application, since the threatened person may not be able to perceive the impending threat even when warned, but a "blind alley" warning could alleviate the problem. Better still is the ability to give more accurate information about the direction and imminence of the threat. Providing this, however, could require enhanced processing capability being carried with the recipient of the signal, which could be undesirable given size and power limitations. Compensating for those requirements while still giving the desired functionality is desirable.

At least some of the preceding examples included sending instrumentality that determined the nature of the threat and the appropriate zone. But, again, with adequate processing power at the location of the recipient, this need not be the case. In another example, two or more entities of interest (e.g., two vehicles) may be implemented with AL capability. The first entity of interest sends location, speed, heading, etc., information. This information is received by the second entity of interest, which compares this information with its own (speed, heading, etc.) to determine if there is a risk of collision or other hazard. In some examples, the first entity of interest corresponds to a forktruck and the second entity of interest to a pedestrian, but in the interest of keeping significant computing needs from the pedestrian, this could be reversed. If, for example, each pedestrian had an AL unit, along with a relatively simple accelerometer or other speed/heading-determining device, the AL unit could periodically broadcast this information. Forktrucks would have an adequate power and size platform for the computing power necessary to receive such periodic signals, and determine based on the position and movement of the pedestrians whether hazards existed. The forktruck operator could be notified to empower him to take preventative/corrective action. Further, given the existence of a communication channel, the forktruck could communicate back threat-specified or otherwise enhanced personalized warning to the affected pedestrians. As before, if mapping of the facility were included in the programming given to the forktruck, it could take especially hazardous situations into account in performing this function, such as pedestrians down "blind"

alleys or corners—and appreciate the enhanced danger and take appropriate action or send appropriate warnings (or both) based thereon.

The examples just described generally rely upon all moving objects (e.g. both pedestrians and forktrucks) having AL capability as well as, in some cases, local processing capability. For example, in the example systems where the emergency vehicle sends out a signal via GPS or other coordinates of the relevant safety zone surrounding it, the vehicle has the processing ability on-board to take the AL data and other data (e.g. its route) and calculate the zone shape and size. Similarly, the receiving object has the processing capability to receive and decode the signal, and compare the received signal to its own AL-determined position. Other systems are possible in which such AL and/or processing capability need not be present on all mobile objects. For example, a centralized AL system could receive a signal transmitted by the mobile objects and determine and track the location of all objects. Such systems will be described below. Hybrid systems combining these types of functionality are also possible.

One such hybrid system could be employed using AL capability for some objects, in combination with a centralized AL system for enhanced system functionality. For example, one such system employs vehicles such as forktrucks which obtain their position by using machine-vision technology to decode ceiling-mounted barcodes that they read as they traverse a facility. The barcodes may be identifying tags (in which case the location is looked up by the vehicle-mounted system once the ID is decoded), or they may be tags encoded with the actual position information. In the latter case, the processor on the vehicle decodes that position information directly by reading the tag. In either case, the vehicle determines its own location in this manner, as well as its direction of travel (this being done by calculating, for example, the angular orientation of the read tag and correlating that to a direction of travel). Once this calculation is done (on either a programmed or an on-demand basis), the vehicle wirelessly communicates with a central processor, illustratively equipped to monitor and track the location of the vehicle. In an enhanced version, information about the facility (the location of walls, racking, etc.) can also be programmed in to the central processor, so that the location of the vehicle (and any other vehicles transmitting AL information) can be shown in the context of the physical facility on an active display (e.g., an LCD display). Additionally or alternatively, the AL information on the vehicles can be used to enhance safety of pedestrians in the facility. This can be done, for example, by creating zones within the warehouse (e.g., presumably in the software executed by the processor). The processor uses the AL and directional information to determine when a vehicle is approaching such a zone. The system is then empowered to take safety-enhancing action such as illuminating warning lights to warn pedestrians in or approaching the area that a forktruck is approaching, and perhaps its direction of approach. Other safety enhancing action shown is the actuation of safety gates or other barriers to prevent access by pedestrians to the danger zone while the forktruck is in the danger zone, and/or as the forktruck approaches the danger zone.

Figure 7:
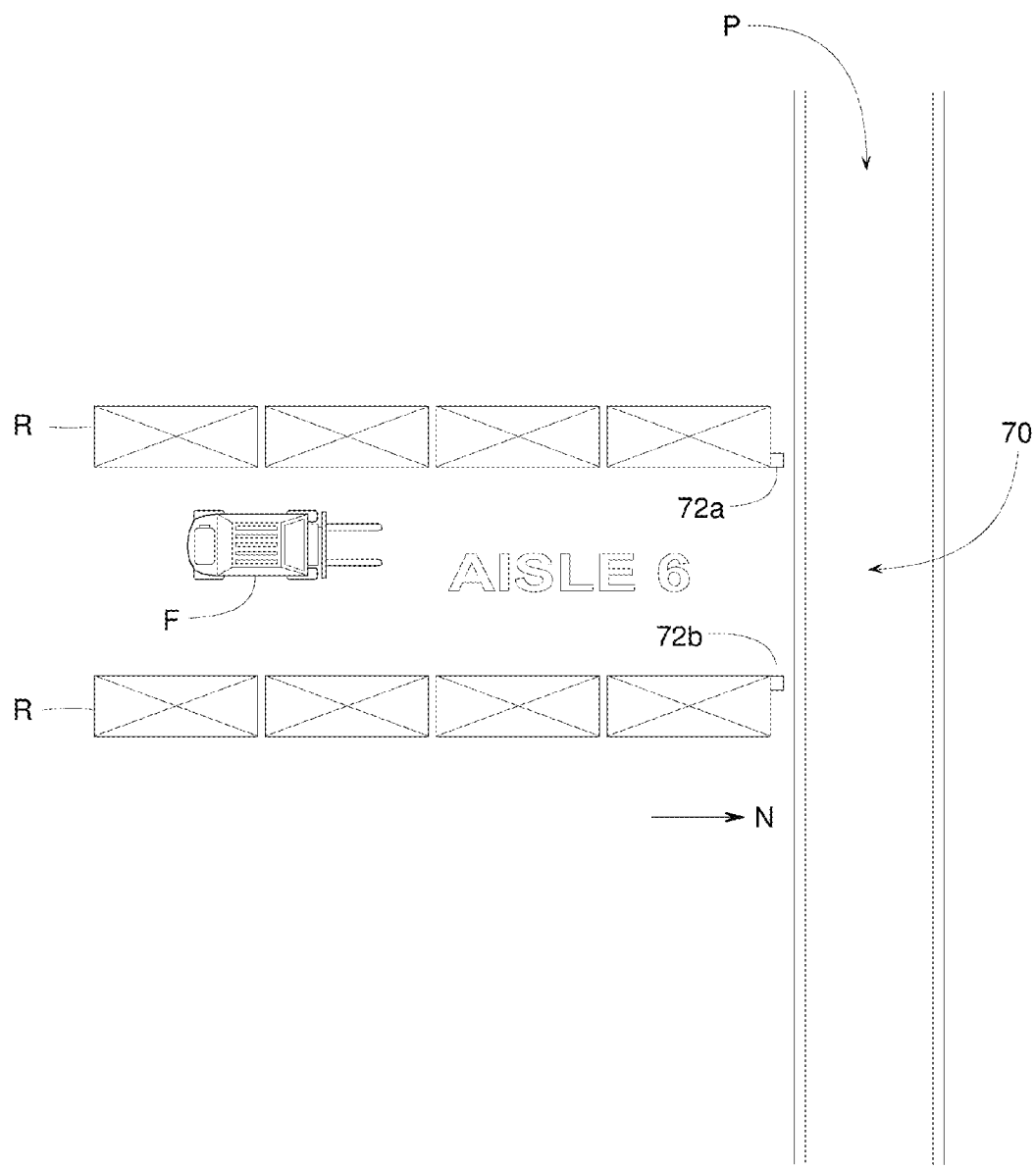
FIG. 7 illustrates an example facility implemented with an example system described herein.

Such AL based technology could be used to enhance its functionality and provide some of the features and benefits of a Personal Safety Zone system. One example is to provide pedestrians with the machine vision capability forming the AL aspects of this approach. In essence, this would make both forktrucks and pedestrians visible and trackable in and by the central processor. Software routines could then be written to process this data and look for potentially dangerous situations, such as collisions. As noted above, however, it is perceived that the cost and complexity of such systems that is portable enough to be carried all the time by a pedestrian are probably too high. Other technologies that would potentially allow AL of all objects (forktrucks and pedestrians) do exist, and will be discussed below. Instead, for example, an AL system like that disclosed for forktrucks alone may be used, because the forktrucks typically have the necessary size and access to power to allow practical AL to be performed. That AL information will be provided to the central processor which will be capable of tracking the movement of forktrucks through the facility with the demonstrated mapping of facility structure (walls, racking, etc.). Where this example differs from existing systems is in how the AL information in the central processor is used to determine dangerous situations and provide more effective, and preferably, more personalized warnings of those dangers. For example, FIG. 7 illustrates a forktruck F moving between two rows of racking R toward a double-blind (blind in both lateral directions) intersection 70 with pathway P. Rather than use the central processor to illuminate a beacon at the intersection and provide a generalized warning that might be easily missed or ignored, an alternative is to have the central processor formulate a threat- and/or location-specific warning based on the specific hazard to be conveyed to affected pedestrians (e.g. those within the potential danger area). Potentially affected pedestrians would have the ability to receive the threat-specific warnings. For example, if the aisle the forktruck is moving down is designated as aisle 6, given the AL and tracking ability of the central processor, it is capable of formulating a warning such as "Forktruck approaching intersection from aisle 6, heading north—use caution" to be conveyed to pedestrians approaching that blind intersection from either direction along pathway P. That message would then be conveyed to some means for communicating that message to the potentially affected pedestrians.

It may be desirable for this message to only be conveyed to pedestrians that could actually be harmed by the forktruck approaching that intersection. There are different methods or ways to achieve that end. One category of such approaches would be "passive" communication systems, in which the threat-specific warning is conveyed irrespective of whether endangered pedestrians have been detected in some manner. For example, the warning could be broadcast by conventional RF transmitters 72$a$, $b$ illustratively positioned on the ends of the racking R adjacent intersection 70, and any RF receivers within a given range could detect the signal. Illustratively, the field shape or range of that transmission could be modulated based on the nature of the threat to selectively warn pedestrians in a certain proximity or direction from the threat. The central processor could use AL position and heading data to determine the size of the area adjacent, for example, aisle 6 intersection within which pedestrians could be harmed if the forktruck continues its then-current trajectory (referred to in this context as the "danger zone"). The size of that area would presumably get smaller as the forktruck F got closer to the intersection 70. In addition to the warning message itself, the central processor could also provide the RF transmitter with the information about the size and shape of the danger zone. The transmitted warning signal would not only convey the message, but would only be broadcast to be received with adequate signal strength by only those receivers in the danger zone. Such an arrangement may place an RF transmitter at or adjacent the "danger zone" in question which could be addressed by the central processor.

Another way to transmit a generalized, but location-specific warning is to use directional sound. For example, ultra-sound can be used to create focused beams of wave energy from a reasonably-sized source such as, for example, the size of a conventional speaker. The focused beam maintains its integrity for long distances, such that only those individuals in the path of the beam receive the waves. As the ultra-sonic frequency waves propagate, they interact with each other and the surrounding air in predictable ways. Thus, an audio input signal can be converted into an ultrasonic directional sound beam that will interact with itself and the air to result in the listener hearing a reproduction of the original audio signal. Given the ability to collimate and focus this sound, it can be directed at very specific physical areas, for example, an area where one would want to warn a pedestrian of an attendant danger. Returning to the example of FIG. 7, directional sound generators are mounted at 72a and 72b and are aimed at potentially dangerous areas based on the approach of the forktruck F to the intersection 70, and the central processor would formulate appropriate warnings based on the AL position of approaching vehicles. Modulation of the shape and size of the directional sound warning could be provided based on vehicle speed and position (e.g. the warning area getting smaller as the vehicle approaches).

In an "active" communication system, warnings (general or endangered-pedestrian specific) are generated only when there is the potential for danger based not only on forktruck approach or presence, but also the sensed presence of a threatened individual. Some means for detecting the presence of such an individual will be required in such a system. Some example systems employ motion or presence sensors such as, for example, the I-Zone sensor used by Rite-Hite Doors, Inc. of Milwaukee, Wis. to detect the presence of moving objects adjacent a closing high-speed door. A semi-cylindrical lens with alternating masked and unmasked sections divides the field of view of a passive IR sensor into spaced fan-shaped detection areas. According to the logic, an IR signal has to be detected by consecutive detection areas within a given timeframe to trigger a detection event of a moving object. Other forms of presence/motion detection can be employed. Such a sensor is installed at the potentially hazardous intersection 70 of FIG. 7 (although this is only an illustrative example). An approaching forktruck (as determined by the AL central processor) makes the sensor "hot". In some examples, the sensor may continuously sense an area and send output signals, and the output signals may be ignored until the area is hot. In other examples, the sensor is only powered when the area is "hot" or a dangerous condition is sensed. Either way, the potentially dangerous approach of a forktruck to the monitored area makes it "hot" for the detection of people. Such a detection event can trigger a generalized warning, or a threatened-pedestrian specific warning assuming that an adequate communication channel exists to allow for such. Safety could be enhanced by also communicating the detection of the person in the hot zone back to the forktruck driver or even imposing speed governance on the vehicle in such a situation.

Relatedly, other technology could be used to determine if there are pedestrians in the danger zone (e.g. RFID radar, triangulation with RFID, actual or localized GPS, or ultra-wideband UWB detection). As above, such detection systems could continuously monitor a dangerous intersection (e.g., the intersection 70 of FIG. 7), and the output signal could be ignored until a centralized AL system detects an approaching forktruck F. Alternatively, the centralized AL system could activate or make "hot" such detection systems only when the forktruck F approaches intersection 70 and a potentially dangerous situation is detected. Once endangered pedestrians are detected, threat-specific warnings are sent to them. If a system is used (e.g., RFID) that also allows identification of the pedestrian, a truly personal warning (e.g., Tom, a forktruck is approaching) could be conveyed.

In other examples, instead of use of an AL system to identify that the forktruck F is approaching the intersection 70, other systems could be used such as a photoeye/reflector described above. Detection of the approach of a forktruck could activate or make "hot" a system for detecting people in the danger area. Thus, a comprehensive system for comprehensively monitoring (e.g., every square inch) of a facility may not be required. Rather, it may be possible to identify high-risk area, like intersection 70, and invest in a relatively more sophisticated, robust detection/sensing systems for that location to work in conjunction with lower level sensing to achieve enhanced safety. Indeed, an industrial facility may be implemented with a patchwork of the example sensing/detecting regimes described herein, along with associated communication channels and techniques. In this manner, choices can be made about the appropriate sensing and communication in given areas given the perceived risks of danger in the various areas. Thus, a system can be implemented that is tailored for different parts of a facility that have different levels of risk (e.g., blind intersections and doorways opening into forktruck aisle ways being particularly dangerous, while open floor space being generally less so). Employing different sensing/communication regimes (some more of which will be described below), an optimized system can be implemented where the appropriate regime is selected and implemented based on the perceived risk of danger in different areas of the facility.

Different examples of systems based on AL of forktrucks have been described herein, for example using the previously-mentioned machine vision system. The first example was "passive" in that general warnings were given in potentially dangerous areas being approached by a vehicle without regard for whether or not an individual was there. The next level was an "active" system for determining the presence of an individual in a potentially dangerous area, and providing warning only in that situation. Sensing can employ presence/motion sensing devices or AL devices that may also facilitate the formulation and delivery of effective, personal warnings. In other examples, described below, all objects are located and/or tracked.

As with the proximity-based and more limited absolute location systems described above, different types of instruments or technologies are available for location and tracking the entities of interest (e.g., forktrucks and pedestrians). Such example systems have already been described relative to forktrucks, and the machine vision technology used in such systems can be configured or adapted to pedestrians as well. In that context, however, it might be optimal to reverse the location of the location markers (bar codes, etc.) and the cameras viewing them so that the bar codes move with the tracked entities, and the cameras are fixedly mounted in the ceiling. This prevents the need for each pedestrian to have to carry the weight and associated electronics and power source of both a camera and networking components. However, line of sight issues with bar codes on people could limit this approach. Other camera or optically-based systems for locating and tracking people, however, could be adapted for this application. For example, camera and image-processing technologies exist for the purpose of locating and tracking shoppers in retail settings—to determine what kinds of displays they might be attracted to, and to study shopping and dwell time patterns. Generally these systems employ image processing to raw video images to look for image patterns associated with people. An image pattern for a given individual is then tracked as it moves throughout the space. Algorithms can then be applied to the image data to extract useful information about movement patterns and dwell times at particular locations. Such systems can then correlate locations to specific product displays to provide useful marketing feedback and information. Other uses of this technology include security and patient-monitoring applications. Such systems can have a very high level of sophistication, but this can come at the expense of relatively large processing power and time requirements, as well as relatively high costs. A benefit, however, is that the entities of interest do not need to be equipped with any special equipment to allow them to be located and tracked.

Other technologies exist and are emerging in the automotive context that could have application here. These technologies are primarily directed at avoiding collisions between vehicles (particularly when one is in the blind spot of the other), but are expanding in to broader applications of providing warning or taking corrective action for obstructions and/or pedestrians. A given vehicle may be equipped with a host of different technologies to serve these various purposes.

Other systems applicable to the examples disclosed herein require some form of equipment or tag to be carried by the entities of interest, but can provide location and tracking with high fidelity. RFID systems are one example. There, entities of interest are each provided with a readable RFID tag, preferably with a unique identifier. An array of readers can be provided in the facility, which periodically or interrogate the tags. Location can be determined by triangulation, or other techniques known to those of skill in the art including RFID radar techniques. For the tracking of people, use of this and related technology is employed for the tracking of patients in medical facilities. In that context, we have seen different technologies applied depending upon whether the tracking of individuals is done inside or outside of the building. Choices also need to be made about whether to use passive or active tags, as power requirements on tracked entities can be different based on that choice. The location and tracking data collected from such a system is monitored to ensure that patients stay in authorized areas and do not wander beyond them. Warning signaling of such a situation can either be provided to a system operator or to the individual themselves if they are capable of taking corrective action on their own. Application of this technology to track shopping carts in a retail grocery using techniques of RFID radar to actively locate and track up to hundreds of carts real-time has also been demonstrated Another example system employs technology that is similar, but that is advertised as not being subject to the limited range applications of RFID is ultra-wideband (UWB) technology. Here, tracked entities of interest also carry tags like in the RFID setting. An array of UWB interrogators are distributed throughout the facility and use a variety of techniques (e.g. triangulation, Doppler processing, etc.) to locate and track entities based on the response of the tags to interrogation signals. Examples of use of UWB technology includes social networking settings, in which the central processor not only locates and tracks all of the individuals, but also performs processing on stored characteristics for each individual so as to identify when two individuals in close proximity share a common interest. A communication channel from the central processor informs one or both individuals of the match in interests to allow them the opportunity to have a direct interaction. Some examples provide the information to an individual in a "heads-up" display embedded in their glasses.

As mentioned above, the great flexibility and optimization of these various sensing and/or locating and tracking technologies can be beneficially implemented in that the optimal technology can be selected for a given application. Different parts of a facility may represent a lower risk of an accident, and can thus be monitored by a lower level (and likely lower-priced) technology option. Similarly, a given technology may be better suited to the sensing or locating/tracking of a given entity (e.g. a forktruck or a person). If that is the case, separate technologies could be used for monitoring the location of forktrucks versus people. It may also be possible to use level of technology for "gross" location (e.g. RFID) and to then switch to another technology (e.g. based on line of sight) for "finer" location (e.g. when the entities are less than ten feet apart). Given these realities, and the desirability of being able to provide the most effective and reliable safety system for the best price, an aspect of this disclosure is the identification of appropriate sensing/locating/tracking technologies, combined with an application knowledge of the types and nature of hazards at different parts of a facility to create an integrated system of perhaps one, but likely several such technologies that provides a cost-effective way to achieve the desired safety goals.

The example systems described herein may be employed with sensing/locating/tracking to provide enhanced industrial safety systems In addition, the data generated by the example systems regarding the entities of interest may be analyzed to determine the possibility of hazards and to allow the formulation of appropriate responsive action (e.g., in the form of warnings). For the purposes of this description, this analysis of the data regarding the entities of interest will be referred to as "hazard discrimination" and performed by what we term a "hazard discriminator".

Some of the example systems described above employ a low level or simple form of hazard discrimination. In the example system employing proximity-based sensing systems, hazard discrimination came in the form of detection of signal strength above a certain threshold. In the case of the forktrucks sending out RF signals being detected by receivers carried by individuals, the detection of that above-threshold signal strength served as hazard discrimination in that the threshold was selected such that detection was indicative of a potentially dangerous proximity of the transmitting forktruck. In that case, hazard discrimination was distributed and performed locally by the potentially-endangered entity—in this case the pedestrian. This type of distributed hazard discrimination could also place the hazard discrimination on the forktruck. In the example described above in connection with FIG. 5, a forktruck included a directional antenna array, which gave input to a GUI which depicted the locations of pedestrians relative to the forktruck (FIG. 5). With just the GUI, the judgment of the forktruck operator would represent the hazard discriminator, but the processor needed to generate the display could also perform hazard discrimination. In that case, for example, the processor detects when a sensed pedestrian is within proximity of the forktruck considered as dangerous. Note that hazard discrimination in this context is not limited to forktruck/pedestrian interactions, but could apply to forktruck to forktruck interactions, or forktruck to fixed object. The discriminator could be programmed to apply different thresholds for different threats. For example, the distance threshold for identifying the proximity of another forktruck as being dangerous is smaller than the threshold for a pedestrian, since the approaching forktruck has the ability to move faster than a pedestrian. Preferably, the hazard discriminator would have the flexibility to be programmed with different operations for different situations in this manner. Another example of the forktruck performing hazard discrimination would be a case where pedestrians are wearing RFID tags and the forktruck is equipped with a reader and an ability to determine, for example, the time delay between sending of an interrogation signal and receipt of response to give an indication of the location of the pedestrian. A time delay below a threshold is considered by the hazard discriminator to be indicative of a pedestrian in dangerous proximity to the forktruck. Other hazard discrimination operations could be applied.

Hazard discrimination based on proximity is not, however, limited to a distributed basis. Proximity could be the relevant metric for a centralized hazard discriminator using as input detailed location/tracking data about all entities of interest. Again, depending on the application, that data may be provided by different sensing/locating/tracking technologies for different entities of interest. Even so, the centralized discriminator could be programmed to use a proximity hazard discriminator or operation to discriminate hazards. For example, the centralized discriminator may access a facility layout database and can be configured to calculate the distance between different entities of interest to determine when proximity between entities of interest is indicative of a potential hazard. Again, interactions between different entities of interest (forktruck/pedestrian v. forktruck/forktruck) may require different thresholds or operations for determining the existence of a potentially dangerous situation. Moreover, whether proximity-based hazard discrimination is performed on a distributed or centralized basis, it may be desirable to establish multiple thresholds for specific interactions of entities. For example, in the case of an interaction between a forktruck and a pedestrian, the hazard discriminator may be programmed to consider a first proximity as potentially dangerous and requiring continued attention by the discriminator—but not yet rising to the level where any corrective action (e.g. warning signaling) is indicated. If subsequent analysis (within some meaningful timeframe) of the proximity of the entities indicates that they are even closer, and below a second predetermined threshold, the discriminator may be programmed to consider that proximity as a relatively higher potential danger, and thus initiate a first level of warning signal (the term "initiate" is used broadly here, as the discriminator itself may not generate the actual warning signal, but could provide an output or signal level when that level of threat is detected, which signal could be used by another component or subsystem to actually formulate and deliver the warning). Finally, if the entities continue to draw closer in a temporally meaningful period, as indicated by subsequent analysis of proximity data, the discriminator could be programmed to determine this proximity as falling below a third threshold, and be indicative of an imminent collision. Such a determination would then initiate or trigger an even higher level of corrective action such as providing a more forceful or discernable warning, or applying the brakes or disabling the engine of the forktruck to prevent its further movement. The benefits of such a phased approach to hazard discrimination and warning include the reduction of nuisance warnings, pedestrians and forktruck operators get notification-level warning when the threat is low, and immediate-attention-required level warning when danger is really imminent—in the hopes that they will pay attention and respond to the latter, while having at least their awareness raised by the former. Indeed, in the scenario just described, some level of potentially dangerous proximity as determined by the hazard discriminator does not even result in any warnings, so long as the threat of potential danger does not increase when the data is analyzed at a later time.

In some examples, hazard discrimination based on proximity alone may not take into account the physical realities of a situation or danger such as the presence of structure (building walls, columns, storage racking) that would effectively prevent a collision between a forktruck and pedestrian that are otherwise in dangerously close proximity. In some examples, different techniques are applied to remedy this weakness, depending on the sensing technology employed. For an application where a forktruck is transmitting RF to be detected based on signal strength by detectors carried by pedestrians, an RF shielding can be added to the fixed obstacles or structure so that the RF would not be transmitted through those obstacles. In the case of a forktruck carrying an RFID or UWB reader and sending interrogation signals to tags carried by pedestrians, the fixed obstacles could be provided with tags assigned to ID's that the readers are programmed to recognize as obstacles that the hazard discriminator should take into account when determining the existence of a threat. Other direct techniques can be used in centralized locating/tracking hazard discrimination regimes. In that context, the hazard discriminator can be programmed with a mapping of the location of the fixed obstacles throughout the facility. The hazard discriminator could then include a step of determining whether such an obstacle is present between two entities of interest.

Figure 8:
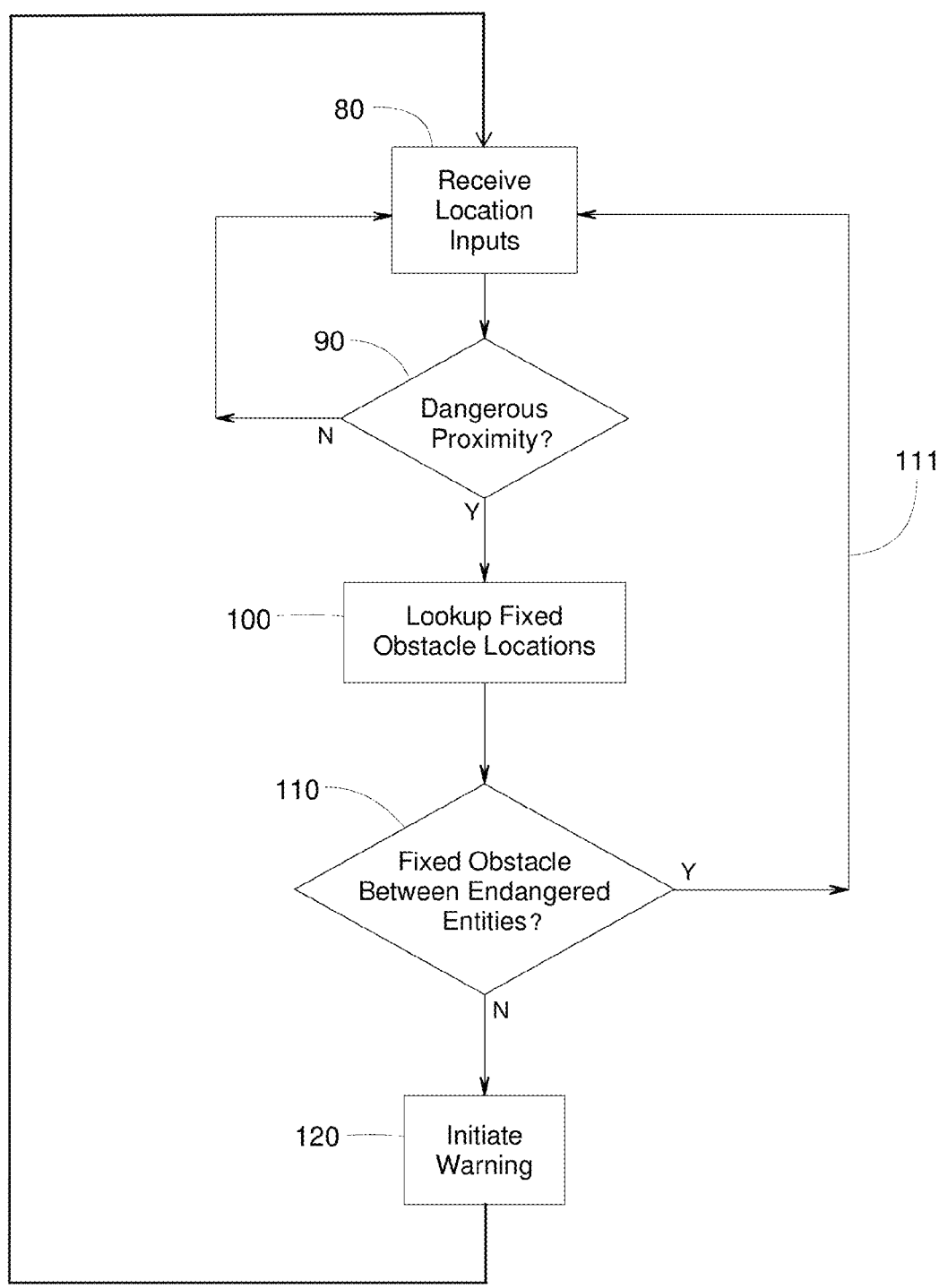
FIG. 8 is a flowchart representative of example machine readable instructions described herein that may be executed to implement an example system described herein.

A flowchart representative of machine readable instructions that may be executed to implement an example system described herein is shown in FIG. 8.

The example machine readable instructions of FIG. 8 begin execution at block 80 at which location data for the two entities of interest (e.g. a forktruck and a pedestrian) is received as inputs. For example, sensors and/or detection devices may be communicatively coupled to a processor, which receives signals from the sensors at block 80. Based on the received signals, the hazard discriminator determines whether the entities are in dangerous proximity (block 90). If the hazard discriminator determines that the location of the entities of interests are not in dangerous proximity, control returns to block 80 to await the next data input (e.g., from the sensors). If the hazard discriminator determines that the location of the entities of interest are in dangerous proximity (block 90), control advances to block 100, in which locations of fixed obstacles are identified via, for example, by reference to a look-up table (e.g., data retrieved via a data storage device). At block 110, the location data of the entities of interest is compared to that of the fixed obstacles to determine whether a fixed obstacle is present between the entities of interest. If the hazard discriminator determines that a fixed obstacle is present between the entities of interest (block 110), the hazard discriminator determines that a potentially dangerous condition does not exist and control returns to block 80. If the hazard discriminator determines that a fixed obstacle is not present between the entities of interest (block 110), a danger condition is indicated, and control initiates a warning (block 120). Control then returns to block 80.

Figure 9A:
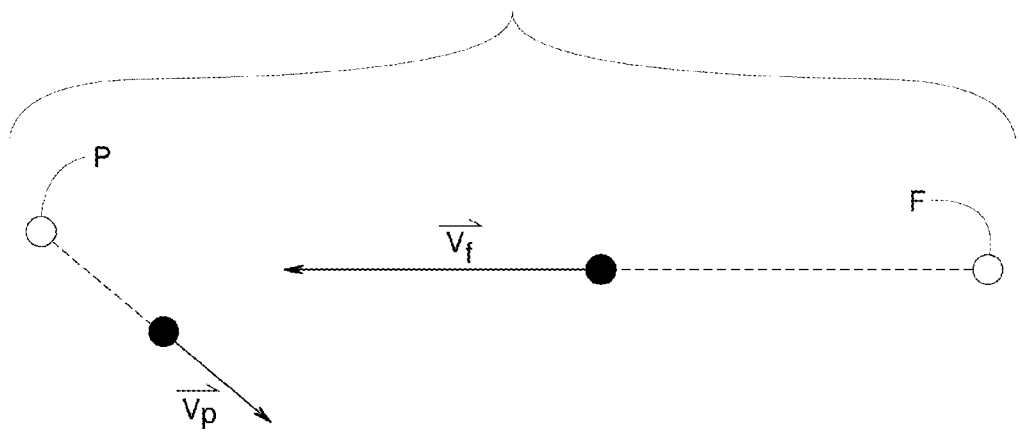
FIG. 9A illustrates an example vector-based trajectory of two entities of interest.
Figure 9B:
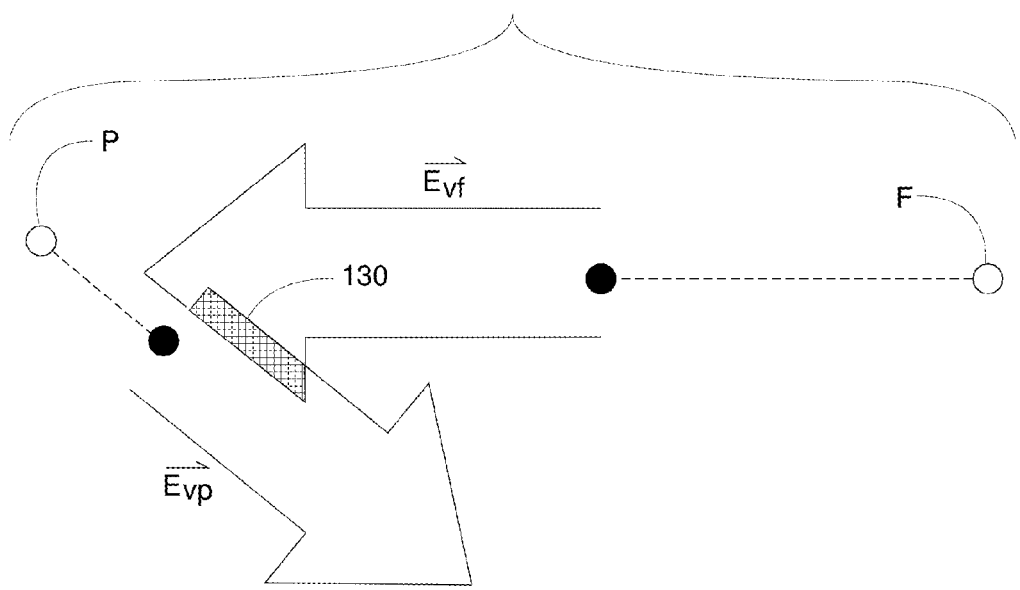
FIG. 9B illustrates an enhanced example vector-based trajectory of the two entities of interest shown in FIG. 9A.

In addition to providing this type of enhancement to proximity-based detection, a central locating/tracking system can provide other benefits that a distributed proximity-based system cannot (e.g. one based on signal strength detection alone). For example, the processing capability needed for tracking over time, allows the hazard discriminator in such a system to include an aspect of predictive analysis within its operation. An example of this predictive ability is illustrated in FIG. 9A. There, a first data point of a forktruck F and a pedestrian P are represented by open circles. The second data points (taken later at some predetermined interval) are represented by closed circles. Note that the separation between the data points for the forktruck is further spaced than that for the pedestrian indicating the forktruck moving at a faster speed. In this example, the hazard discriminator is capable of determining both the speed and direction of both entities and calculating a trajectory vector V for each entity. The hazard discriminator compares the two trajectory vectors V (sub-designated "p" for pedestrian and "f" for forktruck to ascertain whether continued movement on that vector would result in a collision, and, if so, initiate corrective action. Realistically, however, movement of such entities rarely continues on the same vector for an extended time. Accordingly, an improvement to pure vector analysis will be referred to herein as trajectory vector expansion which enhances the predictive value of vectorial analysis. Under this technique, the trajectory vector of each entity is expanded according to a predetermined expansion factor. The expansion factor can be calculated based on a variety of factors, such as speed range of the entity (large for forktrucks, small for pedestrians), acceleration capability of the entity (again large for forktrucks, small for pedestrians), the agility of the entity (smaller for forktruck, larger for pedestrians if defined as the ability to change direction with a relatively smaller linear displacement), and possibly other factors. According to the technique, whenever a trajectory vector V is calculated for a given entity, the expansion factor is then mathematically applied to result in an expanded trajectory vector E, as depicted in FIG. 9B, and sub-designated "vp" for vector-pedestrian and "vf" for vector-forktruck. Comparison of the two figures demonstrates the potential value of this type of analysis. According to the unrefined operation of FIG. 9A, the vectors do not intersect, and a potentially dangerous situation would thus not be indicated. In the example of FIG. 9B, however, the expansion of the trajectory vectors results in overlap 130, which could be interpreted by the discriminator as indicative of a potentially dangerous situation. In the current example, the trajectory vectors V are expanded. Rather than applying an expansion factor to the vectors, for example, the unexpanded vectors could be analyzed. Rather than requiring overlap of the vectors, a dangerous condition could be indicated by a proximity of the vectors within a given range (e.g., the condition indicative of a hazard is expanded, rather than the trajectory vectors themselves). In this example, the proximity indicative of a dangerous condition is predetermined based on a variety of factors such as entity speed range, acceleration, agility, etc.

FIG. 9C is a flow diagram illustrating example machine readable instructions 9000 which may be executed to implement a system that includes predictive analysis such as that illustrated in FIGS. 9A and 9B. The system is provided with appropriate sensors to detect the presence and movement characteristics of objects and people as explained above. It is also provided with a processor platform to receive the data collected by the sensors and to execute the instructions of FIG. 9C to identify threats of collision and transmit corresponding warning systems. For ease of explanation, the flowchart of FIG. 9C does not address data collection, but rather focuses on the detection of collision threats and transmission of corresponding warning signals. However, it is to be understood that data representing current positions and/or movement characteristics is constantly or substantially constantly being collected by the system and processed in accordance with the flowchart of FIG. 9C. Therefore, it is also to be understood that the system will instantiate multiple versions of the instructions represented by FIG. 9C (e.g., multiple threads each operating on corresponding sets (e.g., pairs) of objects in sufficient proximity to merit comparison) executing in parallel to quickly identify threats and issue warning signals in a time useful to preventing collisions. To this end, the system analyzes objects using an initial proximity test to identify sets of movable objects within a distance of interest (e.g., 50 feet) and with no barrier (e.g., a wall) therebetween to identify sets of objects to be analyzed. An instance of FIG. 9C is then spawned for each identified set of objects. Each instance may persist (and, thus, continuously monitor and analyze the objects in its set) until there are insufficient active (e.g., moving) objects in the corresponding set to make collision a possibility, or may terminate upon analyzing all object combinations in its set one time and issuing any necessary warnings. This process of identifying sets of objects and spawning new instances of FIG. 9C is repeatedly executed to ensure threats of collision are timely identified. The process of spawning new instances of threads may be initiated on a time basis, an event basis, or be run continuously. The frequency with which the process is executed will depend on whether the instances of FIG. 9C are meant to persist or to terminate after a finite number of executions (e.g., one). An example manner of implementing a system to spawn instances of FIG. 9C is shown and described above in connection with FIG. 8. However, if FIG. 8 is adapted to this function, block 120 of FIG. 8 is to be replaced with instructions to generate a set of objects in dangerous proximity and to spawn an instance of FIG. 9C to analyze the same.

Focusing now on one instance of FIG. 9C, at block 902, if two or more entities of interest are sensed to be in proximity of each other, the system samples movement of each entity in the set of objects (e.g., persons, vehicles, etc.) under analysis at at least two periods or points in time. For example, the system receives first data points for each of the entity of interest and second data points for each of the entity of interest at a predetermined interval of time from the first data points (block 902). The movement of a corresponding entity may be based on, for example, the speed and/or direction of the respective entity. The system then generates a trajectory for each entity in the set based on the movement sample determined by the system (block 904). At block 906, the system expands each entity's trajectory based on at least one characteristic of movement of that entity. For example, the system applies an expansion factor to determine an expanded trajectory vector for each entity of interest (block 906). The expansion factor can be calculated, for example, based on a variety of factors, such as speed range of the entity (large for forktrucks, small for pedestrians), acceleration capability of the entity, the agility of the entity, etc. At block 908, each entity's expanded trajectory vector is then analyzed for overlap with the expanded trajectory vector of the other entities in the set to assess the possibility for a collision. If an overlap between any two modified safety zones is detected (block 910), a warning signal is transmitted to the entities with the overlapping safety zones (block 912). If there is no overlap (block 910), then no warning signal is generated.

The instance of FIG. 9C next determines whether any entities are to be removed from its set of objects (e.g., has an entity left the room, moved behind a wall, moved outside of the threshold distance from all other objects, etc.) or added to its set of objects (e.g., has an object entered the room, moved from behind a wall, etc.)(block 914). If so, the set is modified (block 916). If no modifications to the set are warranted (block 914) or after the set has been modified (block 916), the system determines if the present instance (e.g., thread) of FIG. 9C is to persist (e.g., more than one object remains in the set so that collisions are still a possibility)(block 918). If it is to persist, control returns to block 902. Otherwise, this instance of FIG. 9C is terminated.

Figure 10A:
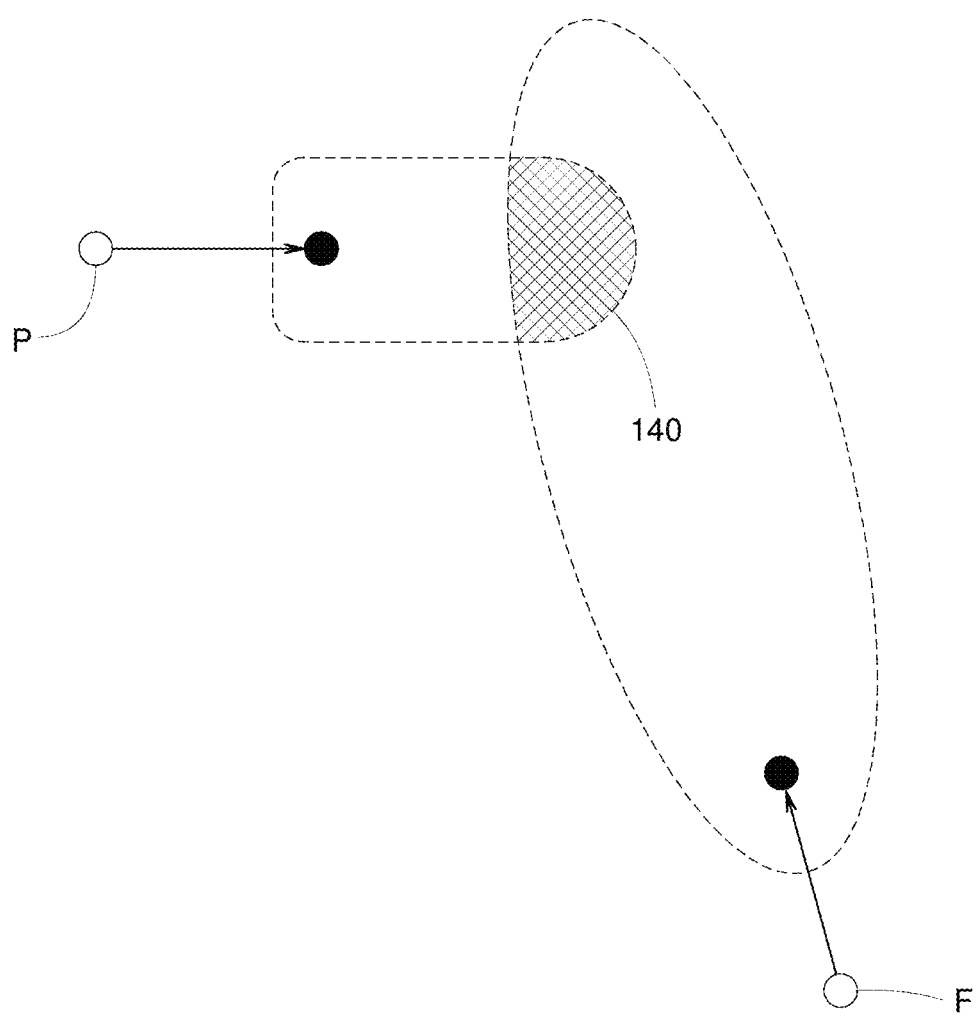
FIG. 10A illustrates a warning zone provided by another example system described herein.

An alternative example for using a centralized location/tracking regime for entities of interest uses a hazard discrimination technique involving an analysis similar to Venn diagrams to determine potentially dangerous situations. In this example, the central processor draws figures around entities of interest indicative of a safety zone around the entity. While the simplest safety zone figure for such use is a circle, other safety zone figures that take factors into account about the entity are also possible. For example, the determined direction of movement of an entity of interest could alter the shape of the safety zone figure. As shown in FIG. 10A, the pedestrian entity P is moving to the right in the figure. Accordingly, the safety zone figure for that entity of interest is calculated as being biased in that direction, for example, as an oblong shape with greater area in front of rather than behind pedestrian P. The size and shape of the safety zone figure is modified based on the recent movement history of the entity. In other examples, the size and/or shape are modified based on other information such as the level of training or experience of the given entity of interest (such information being stored, for example in a lookup table accessible to the processor). In that case, an individual with higher training might have a relatively smaller safety zone figure since his increased safety awareness from the training might reduce the area in which other entities might represent a threat to him. Similar modification of the size and shape of the safety zone figure could also be carried out for forktruck or other vehicular entities, with, for example, the average speed of the vehicle over time. For a "fast" forktruck driver, the safety zone figure is relatively larger, since his higher speed represents potential danger in a greater area. Hazard discrimination is carried out by the processor by calculating and updating safety zone figures for all entities of interest. A hazard discriminator then dynamically seeks overlaps of the safety zone figures (such as the safe zone FIG. 140 in FIG. 10A) to determine potential hazards. This is analogous to Venn diagrams where overlapping regions of two-dimensional safety zone figures representative of set spaces is indicative of common set members for the spaces represented by the safety zone figures. The hazard discriminator could look simply for any overlap between the safety zone figures of all entities, and initiate corrective action when overlap is found. However, in other examples, as overlap is first found, the system (e.g., via a processor) monitors the development of the size and shape of the overlap of the safety zone figures for these two entities. Presumably, as the entities draw closer, the overlap would increase. The processor could be programmed to initiate higher levels of warning based on a determination of an increase in the size, or change in the shape of the overlap indicative of greater danger. A similar technique could be used for taking fixed obstacles (walls, racking, etc.) into account. In that scenario, the processor is programmed with the coordinates of such obstacles, since the presence of an obstacle between two entities may reflect a situation where they cannot collide on their current trajectories based on the presence of the obstacle. In such examples, the processor is programmed to ignore an overlap in the safety zone figures of two entities of interest. This is done, for example, by ignoring an overlap for an interposed obstacle, and/or by dynamically modifying the shape of the safety zone figures for the entities to take into account their proximity to a fixed obstacle, insomuch as the presence of that obstacle impacts the possible path trajectories for that entity.

The safety zone figure technique could also combine both actual overlap of figures with their relative proximity. For example, a close proximity of figures without overlap could trigger the processor to monitor those entities for a reduction of that proximity, up to and including their actual overlap. Potentially, the processor could be programmed to initiate corrective action (warning, signaling, etc.) based only on such proximity of figures instead of waiting for the threat to rise to the point where the figures actually overlap. The processor similarly could be programmed with determinative operation based on past movement patterns of the entities to predict likely movement paths and modify the safety zone figures accordingly. Potentially, such analysis could also lead to the processor initiating corrective action before a potentially hazardous situation actually occurs—perhaps resulting in low-level warning being initiated to raise the awareness of the entities to potential danger based on their current position, and the likely path of such entities based on history.

Figure 10B:
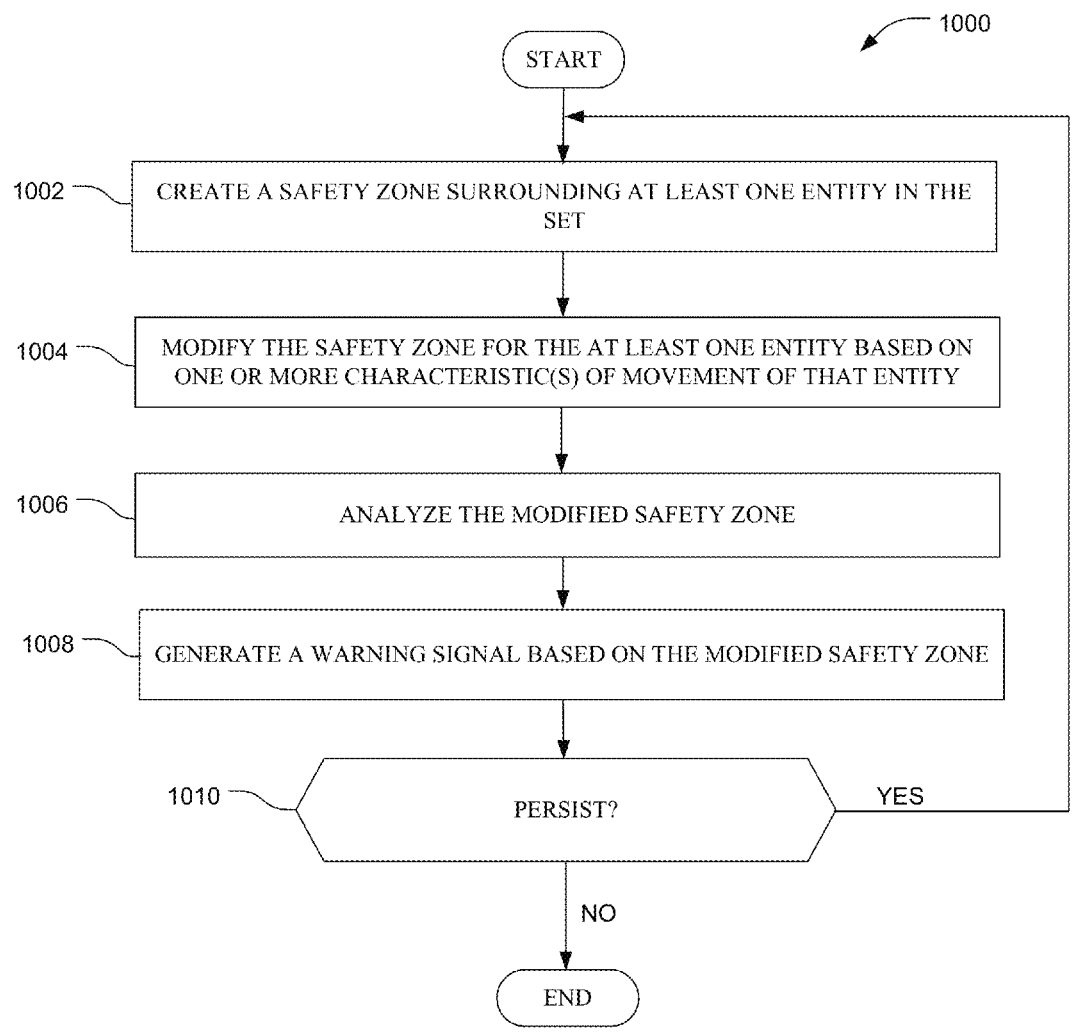
FIG. 10B is a flowchart representative of example machine readable instructions to generate a warning signal based on a modified safety zone.

FIG. 10B is a flow diagram illustrating example machine readable instructions 1000 which may be executed to implement a system such as that illustrated in FIGS. 2A, 2B, 3A, 3B, 4A, 4B and/or 10A. FIG. 10C is another example flow diagram illustrating example machine readable instructions 1020 which may be executed to implement a system such as that illustrated in FIG. 10A. The systems implemented by the machine readable instructions illustrated in FIGS. 10B and 10C may be used with the example systems described above in connection with FIGS. 6C, 8 and/or 9C.

The systems implemented by the machine readable instructions illustrated in FIGS. 6C, 8, 9C, 10B and 10C are provided with appropriate sensors to detect the presence and movement characteristics of objects and people as explained above. They are also provided with a processor platform to receive the data collected by the sensors and to execute the instructions of, for example, FIGS. 10B and 10C to identify threats of collision and/or transmit corresponding warning signals. For ease of explanation, the flowcharts of FIGS. 6C, 8, 9C, 10B and 10C do not address data collection, but rather focuses on the detection of collision threats and/or transmission of corresponding warning signals. However, it is to be understood that data representing current positions and/or movement characteristics is constantly or substantially constantly being collected by the system and processed in accordance with the flowcharts of FIGS. 6C, 8, 9C, 10B and/or 10C. It is also to be understood that the systems will instantiate multiple versions of the instructions represented by FIGS. 6C, 8, 9C, 10B and/or 10C (e.g., multiple threads each operating on corresponding sets (e.g., pairs) of objects in sufficient proximity to merit comparison) executing in parallel to quickly identify threats and issue warning signals in a time useful to preventing collisions. To this end, the systems analyze objects using an initial proximity test to identify sets of movable objects within a distance of interest (e.g., 50 feet) and with no barrier (e.g., a wall) therebetween to identify sets of objects to be analyzed. An instance of FIGS. 6C, 8, 9C, 10B and/or 10C is then spawned for each identified set of objects. Each instance may persist (and, thus, continuously monitor and analyze the objects in its set)

until there is insufficient active (e.g., moving) objects in the corresponding set to make collision a possibility, or may terminate upon analyzing all object combinations in its set one time and issuing any necessary warnings. This process of identifying sets of objects and spawning new instances of FIGS. 6C, 8, 9C, 10B and/or 10C are repeatedly executed to ensure threats of collision are timely identified. The process of spawning new instances of threads may be initiated on a time basis, an event basis, or be run continuously. The frequency with which the process is executed will depend on whether the instances of FIGS. 6C, 8, 9C, 10B and/or 10C are meant to persist or to terminate after a finite number of executions (e.g., one). An example manner of implementing a system to spawn instances of FIGS. 10B and/or 10C is shown and described above in connection with FIG. 8. However, if FIG. 8 is adapted to this function, block 120 of FIG. 8 is to be replaced with instructions to generate a set of objects in dangerous proximity and to spawn an instance of FIGS. 10B or 10C to analyze the same.

Focusing now on one instance of FIG. 10B, at block 1002, the system creates a safety zone surrounding at least one entity in the set of objects (e.g., one or more person(s), one or more vehicle(s), etc) under analysis. The size and/or shape of the safety zone is then modified based on one or more characteristic(s) of movement of the at least one entity such as, for example, the direction of travel of that entity (block 1004). For example, the system may modify the safety zone based on one or more of the direction of travel of the entity (e.g., as shown in FIGS. 2A and 2B), the speed of the entity (e.g., as shown in FIGS. 3A and 3B), the direction of movement of the entity (e.g., as shown in FIGS. 4A and 4B) and/or any other characteristic(s) of movement of the entity of interest. At block 1006, the entity's modified safety zone is then analyzed. A warning signal is transmitted or generated to alert or provide a warning to other entities within the modified safety zone of the presence or proximity of that entity based on the modified safety zone (block 1008). If there is no other entity within the modified safety zone, then no warning is generated (e.g., received by a receiver carried by a pedestrian). The system determines if the present instance (e.g., thread) of FIG. 10B is to persist (block 1010). If it is to persist, control returns to block 1002. Otherwise, this instance of FIG. 10B is terminated.

Focusing now on one instance of FIG. 10C, at block 1022, the system creates a safety zone surrounding each entity in the set of objects (e.g., one or more person(s), one or more vehicle(s), etc) under analysis. The system then modifies the safety zone of each entity based on one or more characteristic(s) of movement of that respective entity (block 1024). For example, the size and/or shape of each entity's safety zone may be modified based on a first characteristic of movement of the corresponding entity such as, for example, the speed of the respective entity. Additionally or alternatively, the size of each safety zone may be modified based on a second characteristic of movement of the corresponding entity such as, for example, the direction of travel of the respective entity. Additionally or alternatively, the safety zone may be modified based on a third characteristic of movement such as, for example, a position of a vehicle steering and/or any other characteristic(s) of movement of an entity of interest. Each entity's modified safety zone is then analyzed for overlap with the modified safety zone of the other entities in the set to assess the possibility for a collision (block 1028). If an overlap between any two modified safety zones is detected (block 1028), a warning signal is transmitted to the entities with the overlapping safety zones (block 1030). If there is no overlap (block 1028), then no warning signal is generated.

The instance of FIG. 10C next determines whether any entities are to be removed from its set of objects (e.g., has an entity left the room, moved behind a wall, moved outside of the threshold distance from all other objects, etc.) or added to its set of objects (e.g., has an object entered the room, moved from behind a wall, etc.) (block 1032). If so, the set is modified (block 1034). If no modifications to the set are warranted (block 1032) or after the set has been modified (block 1034), the system determines if the present instance (e.g., thread) of FIG. 10C is to persist (e.g., more than one object remains in the set so that collisions are still a possibility) (block 1036). If it is to persist, control returns to block 1022. Otherwise, this instance of FIG. 10C is terminated.

In the examples of FIGS. 6C, 8, 9C, 10B and 10C the machine readable instructions comprise one or more programs for execution by a processor such as the processor 1712 shown in the example computer 1700 discussed below in connection with FIG. 17. The program may be embodied in software stored on a computer readable medium such as a CD-ROM, a floppy disk, a hard drive, a digital versatile disk (DVD), or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 6C, 8, 9C, 10B and 10C, many other methods of implementing the example system disclosed herein may alternatively be used. For example, the order of execution of the blocks may be changed, and/or some of the blocks described may be changed, eliminated, or combined.

Figure 11:
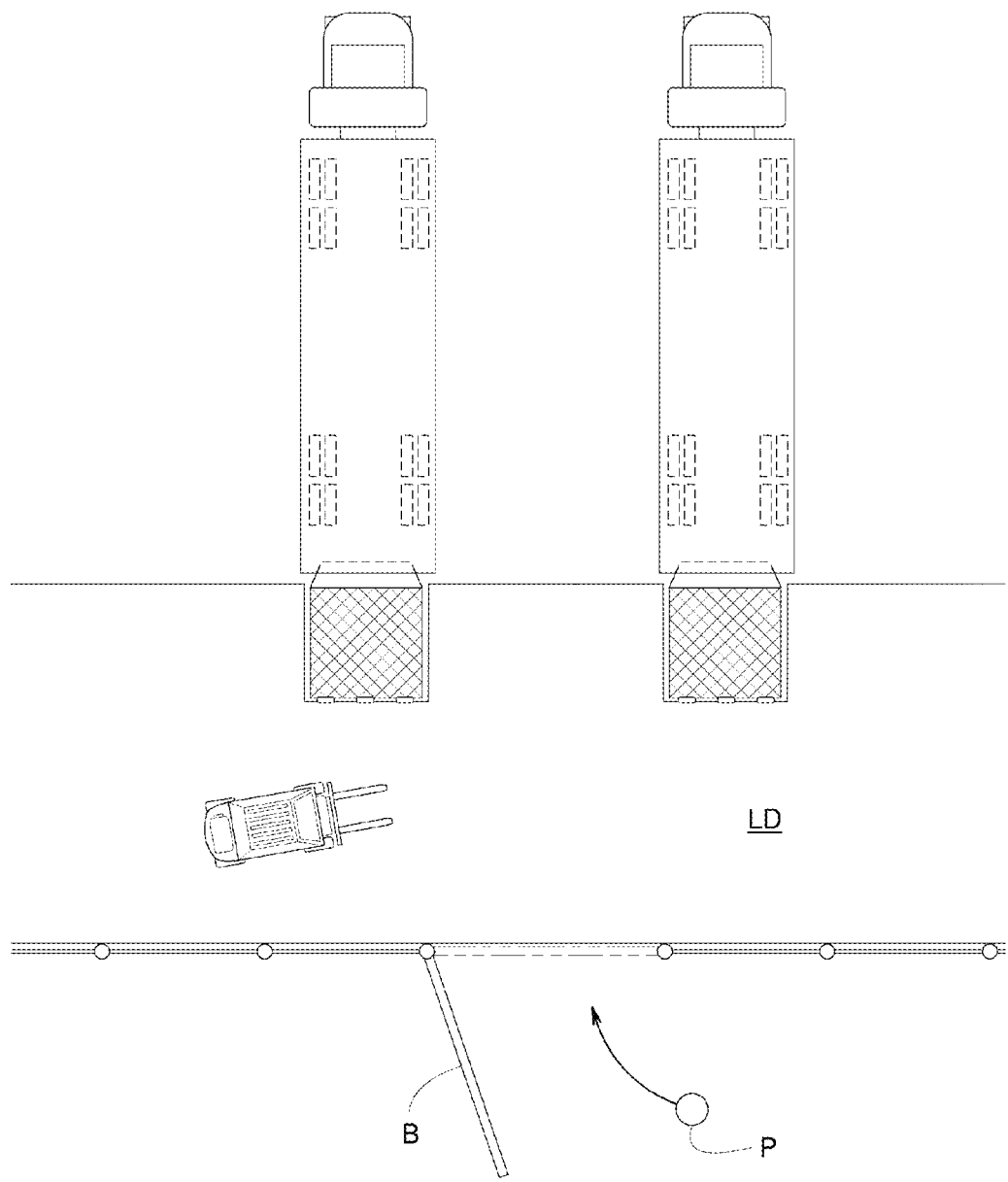
FIG. 11 illustrates an example loading dock area implemented with an example system described herein.

As mentioned above, the example processes of FIGS. 6C, 8, 9C, 10B and 10C may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6C, 8, 9C, 10B and/or 10C may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. For any of the hazard discrimination techniques described herein, determination of a potentially hazardous situation may not result in initiation of corrective action in the form of direct warnings. Rather, the central processor could be programmed to take other corrective action. In the example depicted in FIG. 11, a pedestrian P is about to enter a potentially dangerous high-traffic area as he enters the loading dock area LD.

Assuming that the processor has some means of directly or indirectly controlling an actuable barrier B, such as a safety gate or door, the processor can determine that entry of the pedestrian P into the loading dock LD area is unsafe, and actuate the barrier in advance of the pedestrian P entering the area. Actuation of the barrier would not only physically prevent entry, but would also serve as a form of warning to the pedestrian. If coupled, for example, with a signaling apparatus (e.g., lights) closing of the barrier could also sensitize the forktruck drivers to the presence of a pedestrian. In an attempt to ensure respect for the hazardous situation, the system could prevent the barrier from opening until some form of acknowledgement of the danger by the pedestrian. For example, he could be required to enter a security code, or to await receipt of an audible warning at the site before the gate opens. One could also envision a situation where the forktruck operators are empowered with opening the barrier—but only after some form of acknowledgment of the danger, and then only opening the barrier when the condition is perceived by him to be safe, such as by a visual inspection of the area, or by direct verbal or other contact with the affected pedestrian.

Communication of Threats

Having described a range of both sensing and hazard discrimination techniques to enhance the quality of detection of potential forktruck/pedestrian interactions (e.g. collisions), we turn now to enhancing safety in this environment by improvement of the communication of hazards and/or information related to or empowering corrective action to affected entities of interest. In addition to more effectively detecting hazards as disclosed above, achieving this goal may be enhanced by having a means of directing warning information and/or corrective action information to an affected individual (and, perhaps, not to unaffected individuals) through a communication channel or channels that have enhanced conspicuity relative to conventional channels or through more effective use of existing channels. It may also be achieved by providing a better quality of information to an affected individual, including specifics about the potential hazard that could allow him to take corrective or avoidive action. These specifics could include details about the threat itself, details about the location or direction of the threat and/or temporal or imminence information about the hazard. While a system achieving all of these goals is desired, safety could be enhanced by providing any of them, or sub-combinations of the total. Throughout this portion of the description, it will be assumed that a sensing and hazard discrimination system exists and is capable of interacting with the threat communication devices and techniques described Turning first to communication channels with enhanced conspicuity, a problem with conventional warning systems (colored or flashing lights or strobes, horns, buzzers, etc.) is that people tend to become desensitized to them because of their ubiquity. In addition, they are typically area-general warnings, rather than being targeted to an individual who is actually threatened. Because the warnings are everywhere and generalized, they tend to become ignored over time. Moreover, relative to the aural channel, required hearing protection devices in some locations can severely limit the effectiveness of this channel. Improvements to existing modes of communication enhance their conspicuity.

Sound-based or aural communications of threats to an endangered pedestrian (or other individual) are made more effective by allowing the endangered pedestrian himself to select the warnings or communication he will receive. One example of this allows an individual to select the actual warnings he would receive by selecting the content for different tracks on an MP3 player that he will carry with him and that will be the source of his personalized warnings. One way of allowing for such a personalized selection of warnings is for a pedestrian to actually record warnings of his choosing and in his own voice to provide warnings for given situations. A list is provided to him of what tracks of the MP3 recording are played for different levels of dangerous situations (e.g. Track 1: approaching stationary forktruck; Track 2: forktruck approaching at high speed, etc.), and the user could then record warnings that are relevant or attention-getting to him. In this manner, a user is able to select warning words or speech inflections that would get his attention. For example, a user may choose to include his own name (perhaps shouted) in a warning track for an imminent danger, "JOHN SMITH—danger move NOW!" A colloquial analogy of this is how a parent can typically more easily command their child's attention by using their first, middle and last name. An endangered user should respond to urgent warnings with the same level of attention. In other examples, an employee's supervisor records the warning tracks—again with the idea being that a directive from a supervisor (even if recorded) might elicit a more effective response than an unfamiliar voice making the warning. An alternative to recording full warning tracks for every situation is to record individual words or phrases, and then to provide the user with the hardware and logic to be able to string these pieces together to form a relevant warning depending on the dangerous situation encountered. In an analogy to selecting one's ringtone on a mobile phone, a person could also be presented with a menu of canned or pre-recorded warnings, with the ability to select those that were the most attention-getting.

Another example for effectively conveying aural warnings or other communication uses negative sound, or silence. If potentially endangered pedestrians have an MP3 player with recorded warnings, they could also use the MP3 player to listen to music. As a dangerous condition that requires the pedestrian to be warned is encountered, the first step of threat-communication may be to stop the music playing. Alternatively, instead of music playing when there are not warnings, a white-noise generator could also be provided with the white noise cessation at the time of a warning being a means of attracting the user's attention. As there could be negative safety ramifications to pedestrians or others in an industrial facility listening to music or white noise, we are not recommending such a practice, but present it as an example of a way to improve on effectively capturing a user's attention when a warning needs to be conveyed to him.

Figure 12:
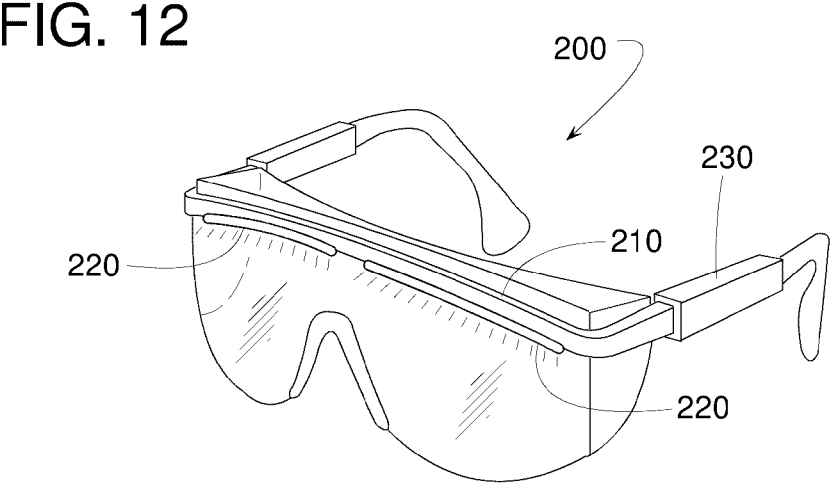
FIG. 12 illustrates example eyewear that can be communicatively coupled to an example system described herein.

Another example threat communication mode with improved conspicuity disclosed herein is visual warnings. Rather than relying on wall or ceiling-mounted lights for area-generalized warnings, conspicuity is enhanced in these examples by visually-based threat communication being personalized to an individual who is threatened, or perhaps the source of the threat (a machine or an individual operating it). In the case of a personalized visual threat-communication, safety glasses are provided with an embedded source of light. A schematic view of an example pair of safety glasses 200 is shown in FIG. 12. Along the upper rims 210 of each eyepiece, a longitudinally-extending light source 220 is provided, such as a side-emitting fiber-optic cable. A source of light, such as a multi-color (for example, red and green) LED is carried elsewhere on the person, along with control electronics and a power source, such as a 12V battery—all represented schematically in functional box 230. Some or all of the contents of functional box 230 could be carried on the glasses (e.g. the LED'S), on the wearer, or even elsewhere. Depending on what components are where and what accompanying electronics are present, either wired or wireless connections among components could be used. The controls and glasses could be programmed to respond to various dangerous situations (as detected by any of the sensing and hazard discrimination techniques described above) by presenting light-signaling to the wearer of the glasses that is highly conspicuous by virtue of its proximity to the eye of the wearer. Different colors or other modulations of the light output from the fiber-optic cables 220 could be used to convey different threats or levels of danger to the user. These will be discussed in greater detail below. As an alternative to LED driven fiber-optic cable, the longitudinally-extending light source could also be a small array of LEDs.

Although the power consumption in terms of creating the visual warning and powering the processor necessary for such a complex warning are high, "heads-up" displays could also be incorporated into safety glasses as such displays are currently incorporated into the goggles used by military jet pilots. Such a heads-up display would actually project warning content in such as way so as to appear in front of the wearer. That warning content could be in the form of words, icons, symbols, etc. and could incorporate other features to enhance conspicuity such as colors, changes in intensity, and the like.

Figure 13:
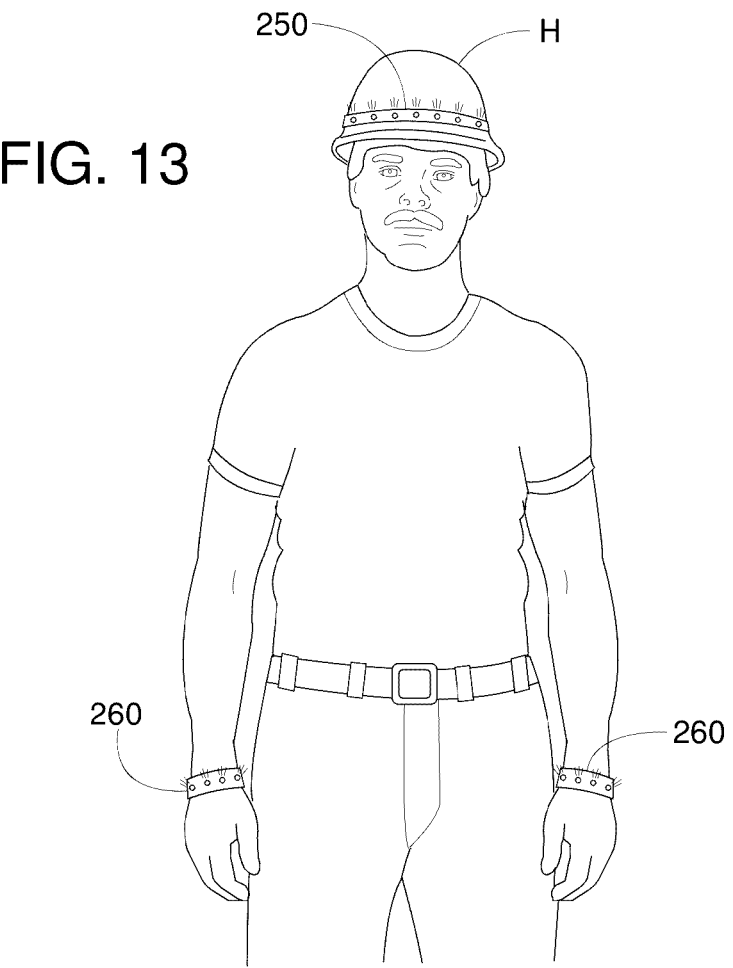
FIG. 13 illustrate an example hard hat and example bracelets that can be communicatively coupled to an example system described herein.

Another example of enhanced-conspicuity visual threat communication actually makes the potentially endangered pedestrian the source of the warning signal. In this example, when a dangerous condition is detected by a sensing and hazard discrimination system (such as a forktruck driving dangerously close to a pedestrian), some part of the pedestrian is illuminated. In the representative drawing shown in FIG. 13, not only does a light array 250 on the pedestrian's safety helmet H light up, but so do bracelets 260 on each of his arms. The intent is for the pedestrian to be a visual warning of the hazardous situation to the source of the hazard—the forktruck and its operator through the illumination of the lights. But since the pedestrian probably cannot see the light array on his helmet (unless perhaps the light signaling is also tied to his safety glasses as described above), the lights on the bracelets 260 on his arms are intended to also convey the potential danger to him in a conspicuous way.

Figure 14:
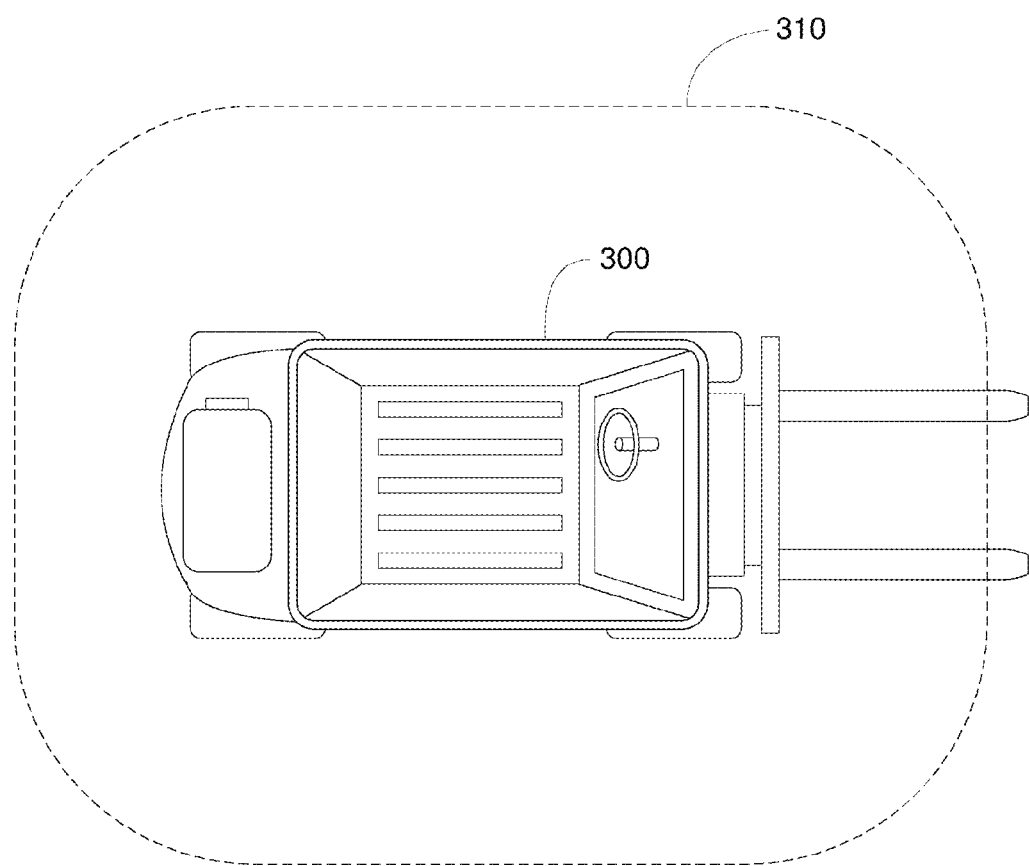
FIG. 14 illustrates an example vehicle implemented with lights to provide a visually conspicuous warning zone adjacent a perimeter of the vehicle.

Enhanced visual conspicuity threat communication can also be carried by the dangerous instrumentality—in this example a forktruck. The forktruck FT depicted in FIG. 14 includes a longitudinally-extending light source 300 on some or the entire lower perimeter of the vehicle. The light-source might be LED driven side-emitting fiber-optic cable, an array of LED's or any other suitable light source. Given that these lights are on a forktruck with access to a greater and more consistent power source, conventional light sources could also be used. In any event, the light source 300 is capable of providing visual warning to surrounding pedestrians by projecting light onto the floor surrounding the forktruck FT, as shown at 310. Under normal operating circumstances (where the sensing and hazard discrimination system does not detect a potentially hazardous situation), the projected light could be green. This is a visual indication to the forktruck operator that things in the vicinity of the forktruck are safe, and a visual indication to others in the facility (if in a line of sight where they can see the color) that a safe condition exists. Once a hazardous situation or potential is detected, the light array 300 projects a different color, for example, the color red. Again, this serves as a conspicuous visual indication to not only the forktruck driver, but also to potentially affected pedestrians in the vicinity. This light signal can also be modulated using techniques previously described. For example, the shape of a projected red light signal could be modulated by forktruck speed or turning status to be relatively larger in a direction of greater potential danger.

Another communication mode that benefits from enhanced conspicuity is the tactile mode. While most tactile communication is personal already (since the sense of touch does not extend beyond the body like the senses of sight and hearing), conspicuity could be enhanced by conducting physiological studies to determine the parts of the body that are the most sensitive to tactile stimuli (vibration, slight electric shock, heat, cold, etc). Without the benefit of such studies, one thought is to incorporate tactile communication into apparel already worn by people in industrial environments (e.g. safety vests, hard hats, safety glasses).

A communication mode that is related to tactile sensation is forktruck speed. If determination of a dangerous situation by a sensing and hazard discrimination system (e.g. a pedestrian in close proximity, passage of the forktruck through a doorway, a forktruck backing out of a trailer with a pedestrian in the loading dock vicinity) resulted in the speed of the forktruck being reduced (perhaps to zero), that reduction in speed would serve as a tactile indication to the forktruck driver of the dangerous condition. Interestingly, the reduction in speed could well serve as a visual warning to pedestrians in the vicinity that a dangerous condition existed—dangerous enough to cause an automatic speed reduction of the forktruck. Combining that reduction is speed with another mode or warning (e.g. an aural or light-based visual warning) could be even more effective.

Figure 15:
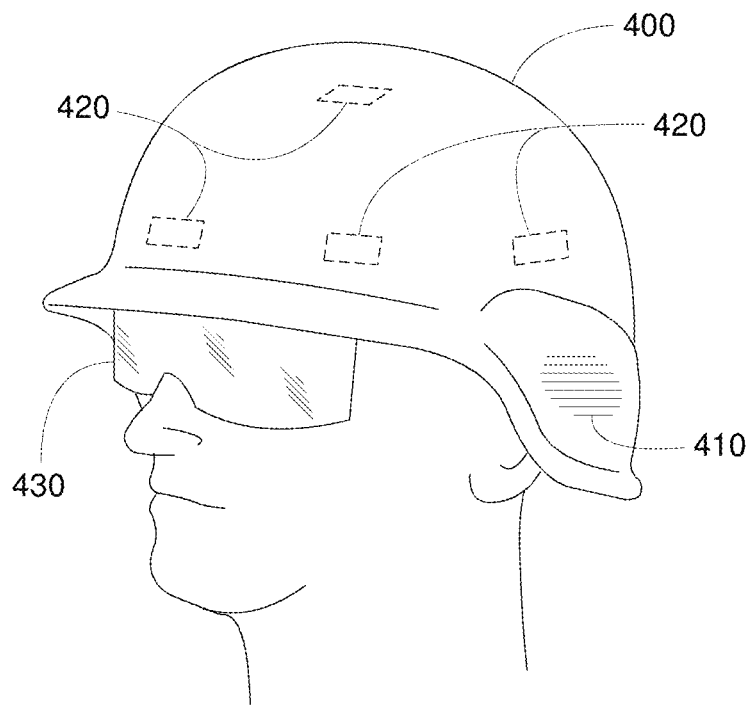
FIG. 15 illustrates another example hard hat implemented with a plurality of warning modes.

In yet other examples, enhancing warning conspicuity is combined with existing (and perhaps improved as described above) modes of warning. As shown in FIG. 15, a hard hat 400 provides a plurality of (e.g., three) different modes of warning. Earphones 410 are incorporated into the hat 400 to provide an aural warning capability. Tactile sources 420 are mounted to the interior of the hat 400 to engage the head of the wearer and convey tactile signals (e.g. vibration, slight electric stimulation, heat, cold). The hard hat 400 also includes integral safety glasses 430 with some form of light-up or heads-up display feature to provide conspicuous visual warning to the wearer. As an alternative, the hard hat 400 could provide just visual and aural warnings, while tactile sources embedded in a vest or other article of apparel could provide tactile warnings. To facilitate such an arrangement, a network could be created on the person, for example, by including Zigbee transponders (or transponders capable of wireless communication through other or similar protocols) in both the vest and the hard hat 400.

Regardless of how such multi-mode warnings are implemented in hardware, the presence of multiple warning modes presents opportunities for enhancing the conspicuity of the warnings generated thereby. One enhancement is provided by how the various modes of warning are staged for the increasing severity of imminence of a threat. Low-level warnings (intended to raise awareness as opposed to empower action) can be provided by a first of the modes—for example tactile. The next level of warning (increased imminence of the dangerous situation) can be provided by a second mode—for example aural. Finally, the highest level of warning (for an imminent potentially catastrophic event like a collision) can be a third mode such as a visual warning. Appropriate training is provided to personnel to recognize the threat hierarchy represented by the various threat-communication modes: in this example vibration of tactile sources means "be aware," aural warnings mean "be prepared to take action," and visual warnings mean "take corrective or avoidive action immediately."

Another alternative to the previous example where the various communication modes were used serially as threat imminence increased, is to use the modes in parallel or at least in combinations to enhance conspicuity. In some examples, the modes are used in an additive fashion. The first level of warning uses one mode (e.g. tactile warning), while the second adds another mode (e.g. visual mode). Finally, for the highest level of warning, all three modes are used together adding an aural warning. This example presumes only three levels of warning and indeed that there are warning levels at all, as opposed to just conveying different hazards with different combinations of modes, which is also a feature that can be provided by a multi-mode warning scheme. The scheme may also be used with different combinations of modes being intended to convey different warnings. Tactile/Visual may mean one warning while Tactile/Aural means another warning and so on. Providing a system with the hardware for multi-mode warnings, as well as the ability to control that hardware to present various combinations and sequences of warnings across those modes will enhance the conspicuity of those warnings. Determining the appropriate multi-mode warning methodology to achieve the desired conspicuity can be facilitated by conducting clinical human responsiveness studies. The results of such studies could reveal the optimal multi-mode warning methodology for given hazardous situations, or reveal optimal warning methodology for the individual warning modes described above.

Figure 16:
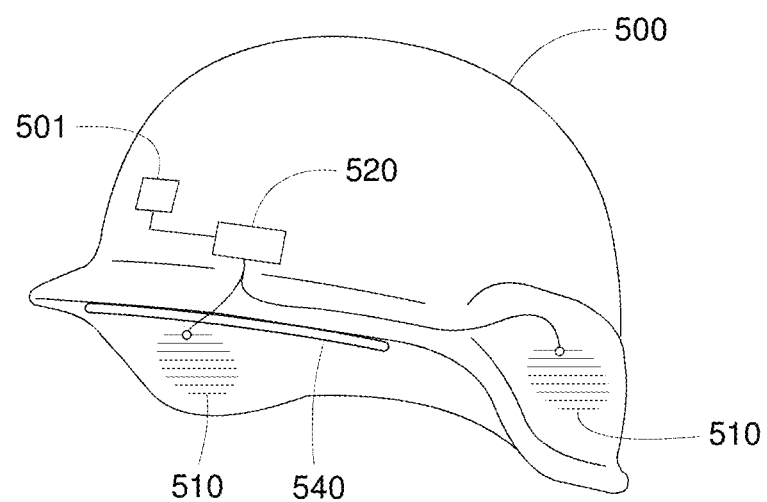
FIG. 16 illustrates yet another example hard hat implemented with a plurality of warning modes.

Another example to enhance communication channel conspicuity is to provide a system with the ability to make sure that the communication channel being used can be sensed above the background signals already present in that channel. As mentioned before, the industrial environment is full of both visual and aural warnings, as well as lights and sounds from machinery, plant operations, material handling and the like. Accordingly, a feature of a conspicuous aural mode warning system is including a sound pressure level (SPL) measuring device for determining the level of background noise above which an alarm must be heard. An example of a hard hat with such an SPL 501 is depicted in FIG. 16. The hard hat 500 also includes integral headphones 510. Finally, a control device in the form of a functional block 520 is provided. The control device is capable of accepting the output of the SPL (the background noise level) and outputting the appropriate aural warning signal at a volume 15-25 dB above the background noise level. 15-25 dB has been determined by physiological studies to be the optimum level above ambient noise to ensure that the warning will be heard, without being so loud that the listener will shut off the alarm. It is also desirable in the context of a multi-mode warning system for a reasonable upper limit to be set in the control device 520 to ensure that hearing-harmful levels of sound are not presented to the wearer. In that situation, the control device 520 is programmed to use different communication mode(s) to convey the warning. In a similar vein, the same hard hat 500 can also be provided with a longitudinally-extending light source 540 under the bill of the hat. In that case, the control device 520 or sensor 501 is able to sense ambient light levels (such as with a light-level dependent resistor) and output a light level of the light source 540 that is sufficiently above the ambient light level to be seen by the wearer.

The conspicuity of threat communication is also enhanced by modulating the threat communication based on the imminence of the threat. Regardless of the mode (or modes) of threat-communication, the signal is modulated to convey a different signal as the threat imminence increases. An example of this in the context of an aural warning is volume. As the threat becomes more imminent, the volume of the warning increases. The pitch of an aural warning (whether a single tone, or a complex audio signal like speech) could also be modulated in this fashion. For a repeated aural warning, the periodicity of the repetition can be modulated to convey increasing threat imminence presumably with shorter cycles indicating more immediate danger. Rhythm could also be modulated for a multi-beat sound, for example with greater syncopation of the beat being indicative of a more imminent threat. Moreover, one or several of these forms of modulation could be combined to further enhance conspicuity. Supplying all of these modulation elements together could make the warning signal into something akin to a musical signal. A colloquial example of these various aural modulations combining to convey the rising imminence of a threat is the theme music to the film "Jaws". Tempo, rhythm, volume and pitch are all modulated to convey the danger of the shark drawing closer and finally striking. This music is clearly conspicuous to the listener, and using similar modulation techniques can make aural warnings in the industrial setting equally as conspicuous.

In a similar vein, the other threat-communication modes can be modulated by threat imminence in a similar manner. For the visual mode, brightness, color and flash rate are synonymous with volume, pitch and tempo (repetition rate) for sound and the rhythm of the light can also be modulated. Indeed, both sound and light could be modulated (in either the same or different ways) with increasing threat imminence. For example, tone warnings and light flash warning could be simultaneous for low threat levels, but have some level of alternation or indeed syncopation for high threat levels. Tactile sensations could be similarly modulated again either in isolation or in combination with other threat communication modes.

While the imminence of a threat is an aspect of the threat that can be specified in the warning(s) presented to the endangered person, additional aspects of the threat can also be conveyed to enhance threat communication. Several examples of threat-specified warnings will be presented below. One theme of threat-specified warnings is to provide enough information to the endangered person to empower that person (e.g. a pedestrian under threat of being struck by a forktruck) with adequate information about the nature of the threat so as to allow him the ability to exercise judgment in either avoiding the hazard or extricating himself from the dangerous condition. For the purposes of these examples, techniques based on aural (sound) communication will be presented. As show above, however, issuing warning communications in multiple modes (e.g. aural, visual and tactile) may be beneficial, and those additional kinds of warnings could also be employed to convey threat-specified warnings. Moreover, all of the examples related to warnings for the example "endangered person" of a threatened pedestrian could apply equally to other people involved in the situation, such as forktruck (or other vehicle) operators, bystanders, etc.

In the area of threat-specified aural warnings, improvement can be made to conventional warnings. Referring to the example of a pedestrian equipped with an RF receiver capable of receiving and decoding RF signals transmitted by a forktruck, a conventional system might provide some warning to the pedestrian when the signal strength rises above a certain threshold indicative of a dangerous proximity of the forktruck. Such a warning conveys only limited information, and may not be adequate to allow the pedestrian to take effective corrective or avoidive action. Rather, a more effective communication of that threat would convey something about its nature. For example, assume that either: 1) the forktruck has the ability to transmit an RF signal modulated by its state of movement (the transmitted signals are different when the forktruck is stationary versus when it is moving, and indicative of the speed and direction of the movement) or 2) that the receiver on the pedestrian has the ability to make such determinations based on the signal(s) received from the forktruck, or a combination of these functionalities. Under that assumed scenario, a threat-specified warning would provide different actual warning based on whether the forktruck was moving toward the pedestrian, or whether the forktruck was stationary and the pedestrian simply moved close enough to be within a proximity that would otherwise be dangerous if the forktruck were not stationary. For the less dangerous situation of a pedestrian moving close to a stationary forktruck, no warning might be given at all. Alternatively, a warning to raise the awareness of the pedestrian might be given since he is close to the forktruck and it might begin moving at any time. For a moving forktruck approaching dangerously close to a pedestrian, a higher level warning of imminent danger might be communicated. If the warnings are communicated to the pedestrian aurally, these different warnings (or indications of corrective action) for different levels of threat could be produced in a variety of ways. In one scenario, several warnings for several different threats have been recorded in some medium and are carried with the pedestrian. An example might be an MP3 player with prerecorded tracks. A unit capable of processing either signals sent from the forktruck modulated with threat-specific information or capable of translating unmodulated signals from the forktruck to determine the threat itself would also be capable of determining which warning should be conveyed to the pedestrian. Track 1 of the MP3 player might be "You are in dangerous proximity to a stopped forktruck—use caution", while track 2 might be "DANGER—Forktruck rapidly approaching—collision possible!" Depending on the threat-specific information determined by the processor, it would output a control command to the MP3 player to play the prerecorded track relevant to the determined danger. In other examples, a processor can be provided with a broad possible vocabulary (for example 50 or 100 words that could be used in warning in the context of interest), and logic for formulating warnings would string together such words depending upon the nature of the threat the processor determines. This would allow the specificity of the threat-warning to be increased, particularly for cases where more accurate and detailed threat information can be conveyed to the processor by the hazard sensing and/or locating systems described above. Moreover, the vocabulary could be dynamically modified over time to keep the warnings "fresh" to the listener.

Other types of threat-specified information can be conveyed to an endangered pedestrian besides the existence or specific nature of a threat, or the imminence of the danger. For a sensing/location system capable of determining imminence of a threat, the identity of the forktruck driver could be useful information to the endangered pedestrian. Rather than simply receiving a warning like "Forktruck approaching—collision possible", one could receive the warning "John Smith's forktruck approaching in 5 seconds". If experience tells the pedestrian that John Smith's safety record or driving habits are poor, the receipt of such threat-specific information may allow the pedestrian to take more effective or swift corrective action. Type of information conveyed in some examples include whether the forktruck is loaded or not. The sight lines for the driver of a loaded forktruck are much more limited than an unloaded truck, and knowing that the truck is loaded may again suggest to the pedestrian that he should treat the threat more seriously. Similarly, it could be useful to the pedestrian to know whether the forktruck was traveling in a forward or rearward direction. Again, the sight lines for a backing forktruck are much more limited than for a traveling forktruck, and this information might be relevant to an endangered pedestrian.

The threat-specificity of the warning being conveyed to an entity of interest can also be improved by including location-specific or direction-specific information about the threat. If an endangered individual, such as a pedestrian in danger of being struck by a forktruck, is told either the direction from which the threat is coming, or the direction of escape from the threat, his response will likely be more effective than if this information is not received. While the benefit of this information is manifest, the means for implementing is not. Part of the difficulty lies in the relative nature of direction. For example, if a pedestrian is facing north, and a forktruck is approaching eastbound from the west, or that the forktruck is approaching on the pedestrian's left. But for the same eastbound forktruck approaching a pedestrian facing south, the forktruck is approaching the pedestrian's right. Directionality in this sense is thus a function of the orientation of the pedestrian. A location or direction specific warning would need to overcome this complication.

Some examples provide the warning system of an endangered individual (e.g. a pedestrian) with compass capability, and for the threat signal provided to that warning system to include the compass orientation of the threat. In this scenario, the warning system is presented with two data points regarding the threat: 1) the current orientation of the pedestrian; and 2) the direction of the approaching threat (e.g. a forktruck). For a pedestrian facing due south (compass direction 180 degrees) and an eastbound forktruck (compass direction 270 degrees), the warning system would determine that a clockwise rotation of 90 degrees would reveal the threat to the pedestrian. Assuming the pedestrian were equipped with a threat-communication system including a right channel and a left channel (e.g. right and left ear phones, or right and left light-up eyeglasses), the right channel is activated in this example to indicate to the pedestrian that a threat is approaching from the right. Activating the right channel for the purpose either of getting the pedestrian's attention and causing him to turn to the right to see the hazard, or to get him to move away from the right orientation since that is the locus of the threat. The imminence of the threat may indicate which of these actions is preferable, so the warning may convey not only the orientation of the threat, but also its imminence, thereby allowing the pedestrian to consider the warning and take appropriate action.

For a threat of relatively low imminence of danger (e.g. a forktruck approaching a pedestrian, but still 30 feet away), the direction-specificity of the warning signal may be modulated by the relative difference of the pedestrian's orientation and that of the threat. Staying with the previous example, detection of the pedestrian at orientation 180 and the threat at orientation 270 gives a signal to the right communication channel of the pedestrian. As he begins rotating toward the 270 orientation, and reducing the angle between his orientation and the threat's, the warning signal could be modulated, for example, with the repetition rate of an aural signal increasing as the pedestrian gets closer to the threat orientation. Similarly, if he turns toward the wrong orientation, the repetition rate would go down. A stereophonic system could also be used to convey directionality to the user.

Another alternative for implementing direction or location specification to a warning signal is to provide a potentially threatened individual with multiple position indicators. Since indicators numbering beyond two might be problematic for our stereo senses (sight and sound), this example may be implemented in the tactile sense, since it is not subject to this limitation. Accordingly, a potentially threatened person is provided with four position indicators in the form of tactile stimulators, illustratively representing left, right, front and back. For a centralized hazard discrimination system capable of distinguishing the location of each of the four position indicators, a warning signal is formulated to only stimulate the indicator or indicators in closest proximity to the hazard. Returning to the south-facing pedestrian and the eastbound forktruck, the hazard discriminator would only stimulate the "right" indicator to indicate the approach vector of the threat. If, however, the forktruck were approaching from 315 degrees (toward 135 degrees), the hazard discriminator send a warning signal stimulating both the "right" and "back" sensors equally. For approach angles between 270 and 315, greater stimulation level might be provided to the "right" indicator than to the "back" indicator, assuming that the tactile sense can adequately distinguish such stimulation levels. Another option is to provide an array of stimulators around the perimeter of the pedestrian's body to be able to use the same approach to achieve greater angular specificity. As with the aural warning, the tactile warning might be modulated as the orientation of the pedestrian approaches the orientation of the threat.

A similar directionality can also be conveyed to the pedestrian even if there is not a centralized hazard discrimination system. In this example, the pedestrian carries the four tactile position indicators, but also carries a similarly-oriented array of four detectors. To provide warning signals, an approaching forktruck emits a repeating signal in a forward direction that can be detected by the four detectors on the pedestrian. Control electronics allow the repeating signal to be received by the four detectors, and resolved to determine the direction of approach of the forktruck. For example, if the pedestrian is facing north, the four detectors are facing the compass points. For a southbound forktruck, the north detector would detect the signal first, followed by a simultaneous detection by the east and west detectors, and finally followed by a detection by the south detector. For the same orientation of the pedestrian, a forktruck approaching on a 45 degree path (toward 225 degrees) would result in a simultaneous detection by the north and east detectors, followed by a simultaneous detection by the south and west detectors. In short, an operation could be programmed into the control electronics to be able to resolve the direction of the threat from any angle. In a similar vein, the control electronics could then control the tactile position indicators to convey the determined directionality to the affected pedestrian. In some examples, the four detectors have the same orientation as the four stimulators, and the control electronics are programmed to first determine the orientation of the threat, and then to stimulate either one or two stimulators to convey that threat orientation. In the case of a threat oriented from the north in our example, only the stimulator in that orientation is activated—but for the threat on a 45 degree vector, both the north and east stimulators are activated. This system has the benefit that it can be implemented without regard for the compass orientation of the pedestrian. If he is facing south instead of north in our example, his back and left stimulators are activated for a forktruck approaching on a 45 degree vector, as opposed to his right and front stimulators if here were facing north for the same forktruck approach. Moreover, the example is not limited to 4 detectors or stimulators, and more of either could improve accuracy.

Some example methods and apparatus described herein not only improve the conspicuity of the warnings that are or can be used for conveying threats, but also improve the content of threat communication. Those improvements include specifying the imminence of the threat, the nature of the threat, relevant details of the threat (e.g. the identity of the approaching forktruck driver, or whether he was carrying a load or not), and/or details about the direction or location of the threat relative to the affected pedestrian. These threat communication enhancements are intended, among other goals, to provide the affected pedestrian with conspicuous and meaningful warnings to not only get his attention, but also to provide him with necessary information to allow him to exercise judgment and take corrective action relative to the now-known threat.

Figure 17:
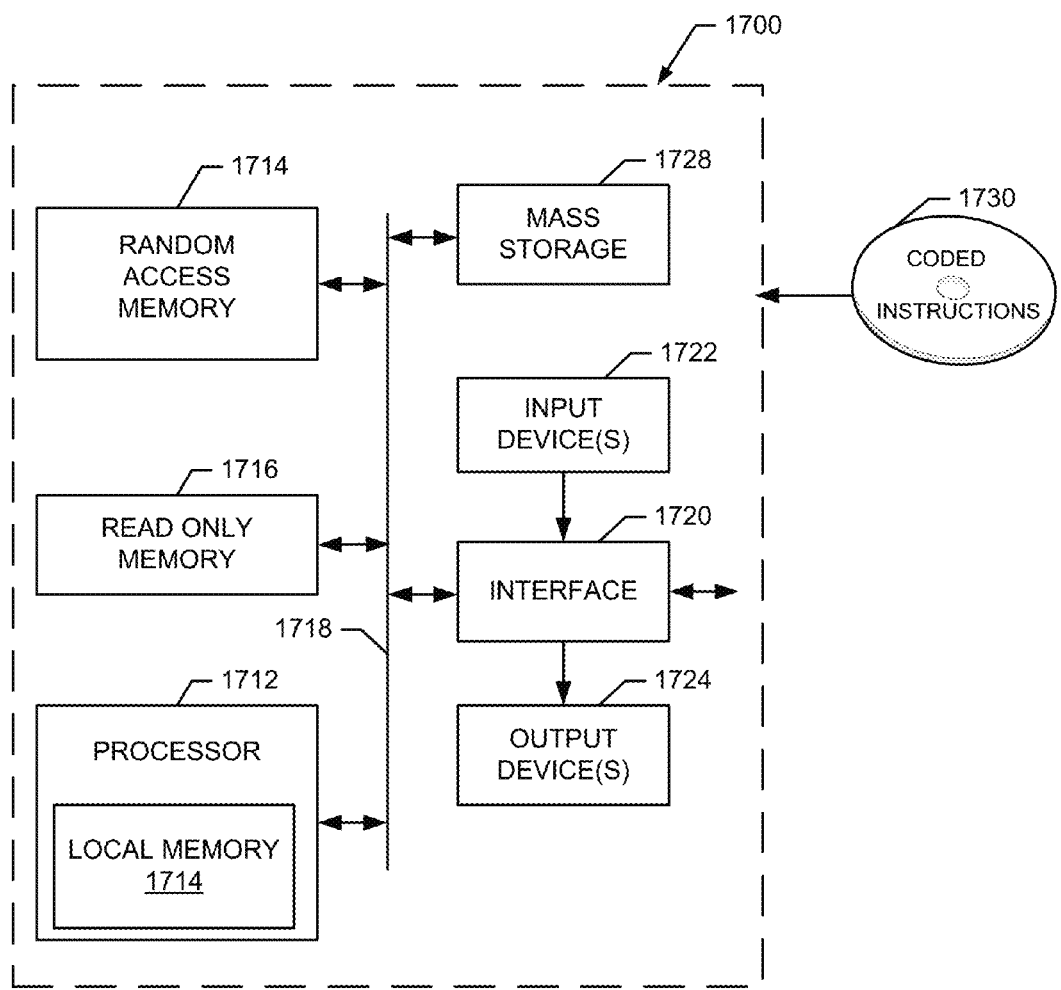
FIG. 17 is a block diagram of an example processing system that may execute the example machine readable instructions of FIGS. 6C, 8, 9C, 10A and 10B to implement the example systems described herein.

FIG. 17 is a block diagram of an example processing system 1700 capable of executing the machine readable instructions represented by FIGS. 4C, 6C, 8 and/or 9C to implement the apparatus and methods disclosed herein. The processing system 1700 can be, for example, a server, a personal computer, or any other type of computing device.

The example system 1700 of FIG. 17 includes a processor 1712. For example, the processor 1712 can be implemented by one or more Intel® microprocessors from the Pentium® family, the Itanium® family or the XScale® family. Of course, other processors from other families are also appropriate.

The processor 1712 is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is typically controlled by a memory controller (not shown).

The computer 1700 also includes an interface circuit 1720. The interface circuit 1720 may be implemented by any type of interface standard, such as an Ethernet interface, a universal serial bus (USB), and/or a PCI express interface.

One or more input devices 1722 are connected to the interface circuit 1720. The input device(s) 1722 permit a user to enter data and commands into the processor 1712. The input device(s) can be implemented by, for example, a keyboard, a mouse, a touchscreen, a track-pad, a trackball, isopoint and/or a voice recognition system.

One or more output devices 1724 are also connected to the interface circuit 1720. The output devices 1724 can be implemented, for example, by display devices (e.g., a liquid crystal display, a cathode ray tube display (CRT), a printer and/or speakers). The interface circuit 1720, thus, typically includes a graphics driver card.

The interface circuit 1720 also includes a communication device (e.g., communication device 72a,b) such as a wireless transmitter, WiFi connection, modem or network interface card to facilitate exchange of data with external computers via a wired or wireless network (e.g., an Ethernet connection, a digital subscriber line (DSL), a telephone line, coaxial cable, a cellular telephone system, etc.).

The computer 1700 also includes one or more mass storage devices 1728 for storing software and data. Examples of such mass storage devices 1728 include floppy disk drives, hard drive disks, compact disk drives and digital versatile disk (DVD) drives.

The coded instructions of FIGS. 6C, 8, 9C, 10B and/or 10C may be stored in the mass storage device 1728, in the volatile memory 1714, in the non-volatile memory 1716, and/or on a removable storage medium such as a CD or DVD 1730.

At least some of the aforementioned examples include one or more features and/or benefits including, but not limited to, the following:

In some examples, an example detection system includes a light source attachable to a forktruck, where the light source projects an illuminated warning field on a floor on which the forktruck is to traverse. The light source projects the illuminated warning field at a distance from a front end of the forktruck. The light source is separate from a headlight of the forktruck.

In some examples, the light source projects a first color to provide a first illuminated warning field when a non-hazardous condition is detected and the light source projects a second color different than the first color to provide a second illuminated warning field when a hazardous condition is detected.

In some examples, the first color includes red and the second color includes green.

In some examples, a selector enables selection between different modes of movement of the forktruck and a detector determines which of the different modes of movement has been selected via the selector, where the modes of movement includes at least one of forward, reverse or stationary.

In some examples, the light source illuminates the illuminated warning field on the floor in front of the forktruck when the forktruck is moving in a forward direction.

In some examples, the light source includes at least one of an adjustable aperture, an adjustable lens, or an adjustable position so that at least one of a shape or direction of the light source is modulated based on signal inputs, the signal inputs including at least one of a speed or a mode of movement of the forktruck.

In some examples, the illuminated warning field projected by the light source has a pre-determined profile.

In some examples, the profile of the illuminated warning field includes a cone-shaped profile.

In some examples, a method of providing a warning field includes attaching a light source to a frame of a forktruck, and projecting a light from the light source to a floor on which the forktruck is to traverse and in a direction of travel of the forktruck, where the light provides a visual warning field having a characteristic indicative of a location of the forktruck.

In some examples, the method includes projecting for at least one of movement or non-movement of the forktruck along the floor.

In some examples, the method includes controlling, via a controller, the light source to project a first color to provide a first warning field when a non-hazardous condition is detected and the light source to project a second color different than the first color to provide a second warning field when a hazardous condition is detected.

In some examples, the method includes determining a different mode of movement of the forktruck including at least one of forward, reverse or stationary.

In some examples, the method includes adjusting at least one of an aperture, a lens, or a position of the light source so that at least one of a shape or direction of the light source is modulated based on signal inputs, the signal inputs including at least one of a speed or the direction of travel of the forktruck.

In some examples, the method includes projecting the visual warning field with a pre-determined profile.

In some examples, the method includes projecting the visual warning field with a cone-shaped profile.

In some examples, a forktruck includes a frame, a pair of headlights, and a light source attached to the frame at a location spaced apart from the headlights. In some such examples, the light source projects on a floor, upon which the forktruck is to traverse, an optical driving path representative of a visual warning signal, where the visual warning signal projects at a fixed location in front of the forktruck to provide a characteristic indicative of at least one of a direction of travel or a location of the forktruck.

In some examples, the visual warning signal is projected for at least one of movement or non-movement of the forktruck along the floor.

In some examples, the light has a pre-determined profile.

In some examples, the light source includes at least one of an adjustable aperture, an adjustable lens, or an adjustable position to adjust at least one of a shape or direction of the visual warning signal.

In some examples, the visual warning signal is conspicuous relative to a light projected by each of the headlights.

Although this patent discloses example systems including software and/or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A detection system comprising:
a light source attachable to a forktruck, the light source to project an illuminated indicator on a floor on which the forktruck is to traverse at a distance from a front end of the forktruck, the light source being separate from a headlight of the forktruck, the indicator to project a first illuminated warning field indicative of a non-hazardous condition when neither a vehicle nor a pedestrian is detected by the forktruck to be within a warning zone of the forktruck, and the indicator to project a second illuminated warning field indicative of a hazardous condition when at least one of the vehicle or the pedestrian is detected within the warning zone of the forktruck, the first illuminated warning field being different than the second illuminated warning field.

2. The system of claim 1, wherein the light source is to project a first color to provide the first illuminated warning field when the non-hazardous condition is detected and the light source to project a second color different than the first color to provide the second illuminated warning field when the hazardous condition is detected.

3. The system of claim 2, wherein the first color comprises green and the second color comprises red.

4. The system of claim 1, further comprising a selector to enable selection between different modes of movement of the forktruck and a detector to determine which of the different modes of movement has been selected via the selector, wherein the modes of movement include at least one of forward, reverse or stationary.

5. A detection system comprising:
a light source attachable to a forktruck, the light source to project an illuminated indicator on a floor on which the forktruck is to traverse at a distance from a front end of the forktruck, the light source being separate from a headlight of the forktruck, the illuminated indicator to project a first illuminated warning field indicative of a non-hazardous condition when neither a vehicle nor a pedestrian is detected by the forktruck to be within a warning zone of the forktruck; and
a selector to enable selection between different modes of movement of the forktruck and a detector to determine which of the different modes of movement has been selected via the selector, wherein the modes of movement include at least one of forward, reverse or stationary, the light source to illuminate the illuminated indicator on the floor in front of the forktruck when selector of the forktruck is in a forward mode of movement and the forktruck is moving in a forward direction.

6. A detection system comprising:
a light source attachable to a forktruck, the light source to project an illuminated warning field on a floor on which the forktruck is to traverse, the light source to project the illuminated warning field at a distance from a front end of the forktruck, the light source being separate from a headlight of the forktruck, wherein the light source illuminates the illuminated warning field on the floor in front of the forktruck when the forktruck is moving in a forward direction, the light source including at least one of an adjustable aperture, an adjustable lens, or an adjustable position so that at least one of a shape or direction of the light source is modulated based on signal inputs, the signal inputs including at least one of a speed or a mode of movement of the forktruck.

7. The system of claim 1, wherein the illuminated warning field projected by the light source has a pre-determined profile.

8. The system of claim 7, wherein the profile of the illuminated warning field comprises a cone-shaped profile.

9. A method of providing a warning field, the method comprising:
attaching a light source to a frame of a forktruck;
detecting a direction of travel of the forktruck;
continuously projecting a light from the light source to a floor on which the forktruck is to traverse and in the detected direction of travel of the forktruck, the light providing a visual warning field having a characteristic indicative of a location of the forktruck; and
controlling, via a controller, the light source to project a first color to provide a first warning field when a non-hazardous condition is detected and the light source to project a second color different than the first color to provide a second warning field when a hazardous condition is detected.

10. The method of claim 9, further comprising projecting for at least one of movement or non-movement of the forktruck along the floor.

11. The method of claim 9, further comprising determining a different mode of movement of the forktruck including at least one of forward, reverse or stationary.

12. A method of providing a warning field, the method comprising:
attaching a light source to a frame of a forktruck;
projecting a light from the light source to a floor on which the forktruck is to traverse and in a direction of travel of the forktruck, the light providing a visual warning field having a characteristic indicative of a location of the forktruck; and
adjusting at least one of an aperture, a lens, or a position of the light source so that at least one of a shape or direction of the light source is modulated based on signal inputs, the signal inputs including at least one of a speed or the direction of travel of the forktruck.

13. The method of claim 9, further comprising projecting the visual warning field with a pre-determined profile.

14. The method of claim 9, further comprising projecting the visual warning field with a cone-shaped profile.

15. The system of claim 1, wherein the first illuminated warning field includes
an optical driving path.

16. The forktruck of claim 15, wherein the first illuminated warning field is projected for at least one of movement or non-movement of the forktruck along the floor.

17. The forktruck of claim 15, wherein the first illuminated warning field is conspicuous relative to a light projected by each of the headlights.

18. The system of claim 1, wherein the light source is activated without input from an operator of the forktruck.

* * * * *